US008909810B2

(12) United States Patent
Caine et al.

(10) Patent No.: US 8,909,810 B2
(45) Date of Patent: Dec. 9, 2014

(54) SYSTEMS AND METHODS FOR MULTIMEDIA CONTENT SHARING

(75) Inventors: Michael E. Caine, Needham, MA (US); Matthew I. Growney, Concord, MA (US); Brent Koeppel, Natick, MA (US); Roberto Tagliabue, Lake Oswego, OR (US)

(73) Assignee: Isabella Products, Inc., Concord, MA (US)

( * ) Notice: Subject to any disclaimer, the term of this patent is extended or adjusted under 35 U.S.C. 154(b) by 342 days.

(21) Appl. No.: 12/221,789

(22) Filed: Aug. 6, 2008

(65) Prior Publication Data

US 2010/0036967 A1 Feb. 11, 2010

Related U.S. Application Data

(63) Continuation-in-part of application No. 12/186,498, filed on Aug. 5, 2008, now abandoned.

(51) Int. Cl.
| | |
|---|---|
| *G06F 15/16* | (2006.01) |
| *H04N 21/414* | (2011.01) |
| *H04N 7/173* | (2011.01) |
| *H04N 21/258* | (2011.01) |
| *H04N 21/475* | (2011.01) |
| *H04N 21/472* | (2011.01) |
| *H04N 21/274* | (2011.01) |
| *H04N 21/658* | (2011.01) |

(52) U.S. Cl.
CPC ..... *H04N 7/17318* (2013.01); *H04N 21/41407* (2013.01); *H04N 21/25866* (2013.01); *H04N 21/475* (2013.01); *H04N 21/47205* (2013.01); *H04N 21/274* (2013.01); *H04N 21/6582* (2013.01)
USPC ........... 709/236; 709/203; 709/206; 709/219; 709/231

(58) Field of Classification Search
USPC ................. 709/203, 206, 207, 219, 231, 236; 705/319; 370/230.1
See application file for complete search history.

(56) References Cited

U.S. PATENT DOCUMENTS

| | | |
|---|---|---|
| D310,919 S | 10/1990 | Sakai |
| D355,170 S | 2/1995 | Mizusugi et al. |

(Continued)

FOREIGN PATENT DOCUMENTS

WO 2010/016866 A1 2/2010

OTHER PUBLICATIONS

Kim, Jeong and Zimmerman, John. "Cherish: SMart Digital Photo Frames for Sharing Social Narratives at Home," Proceeding CHI Extended Abstracts (EA) on Human Factors in Computing, 2006, pp. 953-958.*

(Continued)

*Primary Examiner* — Melvin H Pollack
(74) *Attorney, Agent, or Firm* — Nutter McClennen & Fish LLP; David J. Powsner

(57) ABSTRACT

The invention provides, in one aspect, a multimedia content sharing system that includes (i) a shared content server which stores items of content (such as still, moving images and audio) and (ii) a plurality of nodes, each of which is in communications with the shared content server via cellular telephone and/or other data networks. The shared content server transmits items of content to a first set of the nodes "automatically," e.g., without requests by users of those nodes for the items. At least one node in that first set displays the content of received items (e.g., on an LCD screen) and accepts user feedback in regard to those items. That feedback—which may be, for example, a command to copy an item into an "album", to rotate an item on the display, to block another node from displaying the items, and/or to block a sender (or creator) of the item from sending further items of content from presenting—is transmitted back to the shared content server for distribution to other nodes, which alter their own respective displays of the items accordingly.

84 Claims, 32 Drawing Sheets

(56) References Cited

U.S. PATENT DOCUMENTS

| | | | |
|---|---|---|---|
| D364,857 S | 12/1995 | Chou | |
| 6,154,210 A | 11/2000 | Anderson | |
| D439,901 S | 4/2001 | Ono et al. | |
| D444,794 S | 7/2001 | Nashida et al. | |
| 6,442,573 B1 | 8/2002 | Schiller et al. | |
| D490,810 S | 6/2004 | Huang | |
| D523,868 S | 6/2006 | Kuroda | |
| D524,312 S | 7/2006 | Young | |
| 7,328,243 B2* | 2/2008 | Yeager et al. | 709/205 |
| D586,565 S | 2/2009 | Ko et al. | |
| 7,490,135 B2* | 2/2009 | Klug et al. | 709/217 |
| D587,709 S | 3/2009 | Niitsu et al. | |
| D587,712 S | 3/2009 | Park et al. | |
| D597,320 S | 8/2009 | Caine et al. | |
| 7,574,523 B2* | 8/2009 | Traversat et al. | 709/238 |
| 7,606,562 B2* | 10/2009 | Aaltonen et al. | 455/414.1 |
| 7,664,882 B2* | 2/2010 | Mohammed et al. | 709/250 |
| 7,688,327 B2* | 3/2010 | Robotham et al. | 345/581 |
| D615,549 S | 5/2010 | Caine et al. | |
| 7,711,769 B2* | 5/2010 | Lazaridis et al. | 709/201 |
| 7,730,132 B2* | 6/2010 | Ludwig et al. | 709/204 |
| 7,747,680 B2* | 6/2010 | Ravikumar et al. | 709/203 |
| 7,783,777 B1* | 8/2010 | Pabla et al. | 709/238 |
| 7,792,756 B2* | 9/2010 | Plastina et al. | 705/51 |
| 7,849,140 B2* | 12/2010 | Abdel-Aziz et al. | 709/206 |
| 7,853,711 B1* | 12/2010 | Johnson et al. | 709/231 |
| 7,859,551 B2* | 12/2010 | Bulman et al. | 345/630 |
| 7,860,964 B2* | 12/2010 | Brady et al. | 709/223 |
| 7,873,710 B2* | 1/2011 | Kiley et al. | 709/220 |
| 7,886,001 B2* | 2/2011 | Asthana et al. | 709/204 |
| 7,925,743 B2* | 4/2011 | Neely et al. | 709/224 |
| 7,941,535 B2* | 5/2011 | Sherrets et al. | 709/225 |
| 8,078,688 B2* | 12/2011 | Ansari et al. | 709/217 |
| 8,346,896 B2* | 1/2013 | Brownholtz et al. | 709/220 |
| 8,350,946 B2* | 1/2013 | Jung et al. | 348/333.02 |
| 8,571,535 B1* | 10/2013 | Lin et al. | 455/418 |
| 8,578,502 B2* | 11/2013 | Risan et al. | 726/26 |
| 8,606,383 B2* | 12/2013 | Jung et al. | 700/94 |
| 2004/0046796 A1 | 3/2004 | Fujita | |
| 2004/0150668 A1 | 8/2004 | Myers et al. | |
| 2005/0231520 A1 | 10/2005 | Forest | |
| 2006/0010395 A1* | 1/2006 | Aaltonen | 715/779 |
| 2006/0020960 A1 | 1/2006 | Relan et al. | |
| 2006/0064720 A1* | 3/2006 | Istvan et al. | 725/38 |
| 2007/0255785 A1 | 11/2007 | Hayashi et al. | |
| 2007/0255807 A1* | 11/2007 | Hayashi et al. | 709/219 |
| 2007/0268246 A1 | 11/2007 | Hyatt | |
| 2008/0001735 A1* | 1/2008 | Tran | 340/539.22 |
| 2008/0009272 A1 | 1/2008 | Toledano | |
| 2008/0016255 A1* | 1/2008 | Saint-Hilaire et al. | 710/11 |
| 2008/0032739 A1* | 2/2008 | Hoodbhoy et al. | 455/556.2 |
| 2008/0052026 A1* | 2/2008 | Amidon et al. | 702/104 |
| 2008/0082691 A1* | 4/2008 | Hochwarth et al. | 709/246 |
| 2008/0086431 A1* | 4/2008 | Robinson et al. | 706/11 |
| 2008/0103906 A1* | 5/2008 | Singh | 705/14 |
| 2008/0140720 A1* | 6/2008 | Six et al. | 707/104.1 |
| 2008/0162557 A1 | 7/2008 | Boda et al. | |
| 2008/0165383 A1* | 7/2008 | Myoki | 358/1.15 |
| 2008/0189303 A1* | 8/2008 | Bush et al. | 707/100 |
| 2009/0106389 A1* | 4/2009 | Hakkarainen et al. | 709/217 |
| 2009/0144377 A1* | 6/2009 | Kim et al. | 709/206 |
| 2009/0164606 A1* | 6/2009 | Epifania et al. | 709/219 |
| 2009/0177793 A1* | 7/2009 | Josa et al. | 709/231 |
| 2009/0222517 A1* | 9/2009 | Kalofonos et al. | 709/204 |
| 2009/0248794 A1* | 10/2009 | Helms et al. | 709/203 |
| 2010/0030872 A1 | 2/2010 | Caleca et al. | |
| 2010/0122174 A1 | 5/2010 | Snibbe et al. | |
| 2010/0138746 A1* | 6/2010 | Zarom | 715/720 |
| 2010/0228814 A1* | 9/2010 | McKenna et al. | 709/203 |
| 2011/0047285 A1* | 2/2011 | Kampmann et al. | 709/231 |
| 2011/0246945 A1 | 10/2011 | Caine et al. | |

OTHER PUBLICATIONS

Nahrstedt, Kiara et al. "Hourglass Multimedia Content and Service Composition Framework for Smart Room Environments," Pervasive and Mobile Computing, vol. 1, Issue 1, Mar. 2005, pp. 43-75.*
Almeroth, K.C. and Ammar, M. H. "An Alternative Paradigm for Scalable On-Demand Applications: Evaluating and Deploying the Interactive Multimedia Jukebox," IEEE Transactions on Knowledge and Data Engineering, vol. 11, Issue 4, Jul./Aug. 1999, pp. 658-672.*
Gaonkar, Shravan et al. "Micro-Blog: Sharing and Querying Content Through Mobile Phones and Social Participation," Proceedings of the 6th International ACM Conference on Mobile Systems, Applications, and Services (MobiSys), 2008, pp. 174-186.*
Lowensohn, Hosh. "Newbie's Guide to Flickr," CNET, Mar. 30, 2007.*
Cevia Digital Photo Frames: QUickstart Guide for Use with LF4007 and LF4008 Models, 2007.*
Cevia Digital Photo Receiver: LF3000 Owners Guide, 2005.*
PhotoVu Digital Picture Frame, Online Manual-v2.x.x Category, Knowledge Base Articles, 2009.*
Honig, Zach. Sony VAIO Wi-Fi Photo Frame (VGF-CPI), PCMAG, Dec. 9, 2008.*
Honig, Zach. Kodak Easyshare W820 Wireless Digital Frame, PCMAG, Dec. 8, 2008.*
Honig, Zach. D-Link Wireless Photo Frame (DSM-210), PCMAG, Dec. 11, 2008.*
Otmar, Hilliges et al. "Photohelix: Browsing, Sorting and Sharing Digital Photo Collections," Second Annual IEEE International Workshop on Horizontal Interactive Human-Computer Systems, Oct. 10-12, 2007, pp. 87-94.*
International Search Report & Written Opinion, PCT Application No. PCT/US09/04309, mailed Nov. 3, 2009, 19 pages.
[No Author Listed] Working screenshot of Windows XP. Service Pack 2. Manufactured by Microsoft, published Aug. 25, 2004, 17 pages.
International Preliminary Report on Patentability for International Application No. PCT/US2009/004309, mailed Feb. 17, 2011.

* cited by examiner

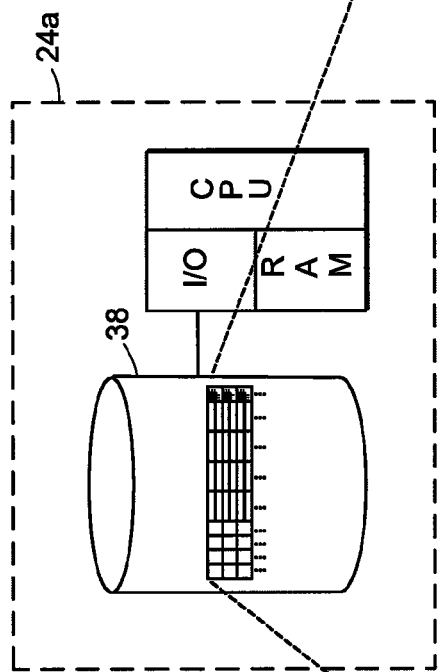
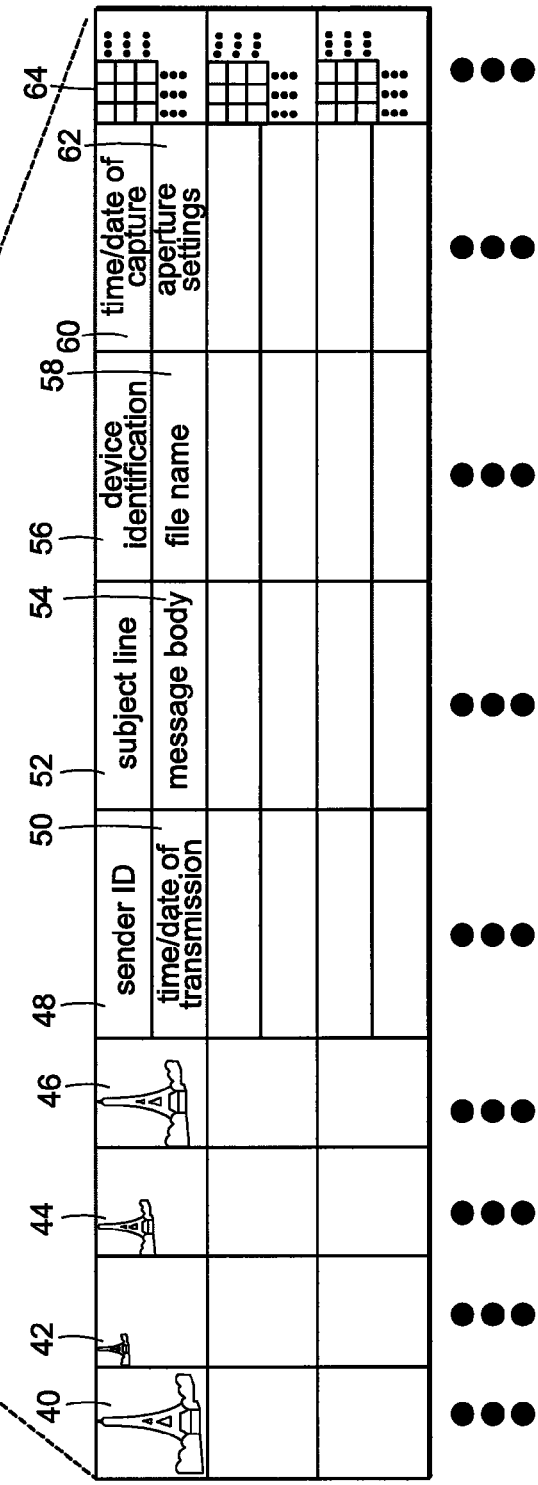
FIG. 2

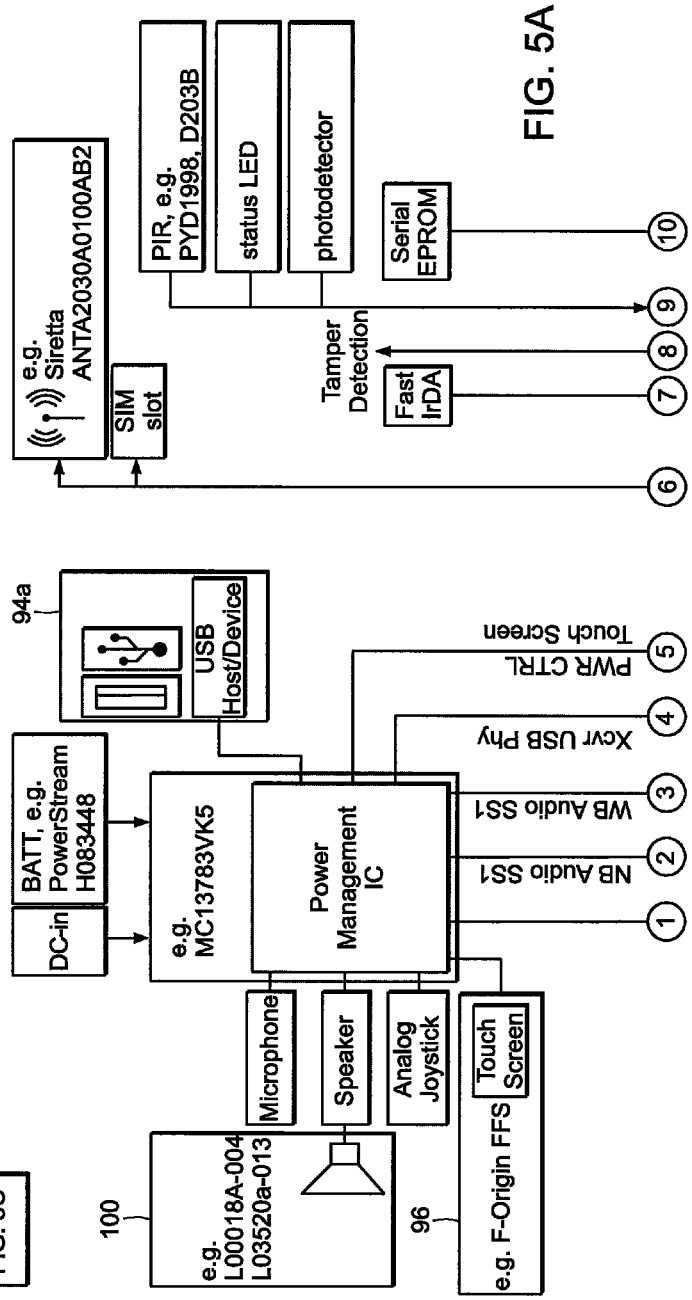

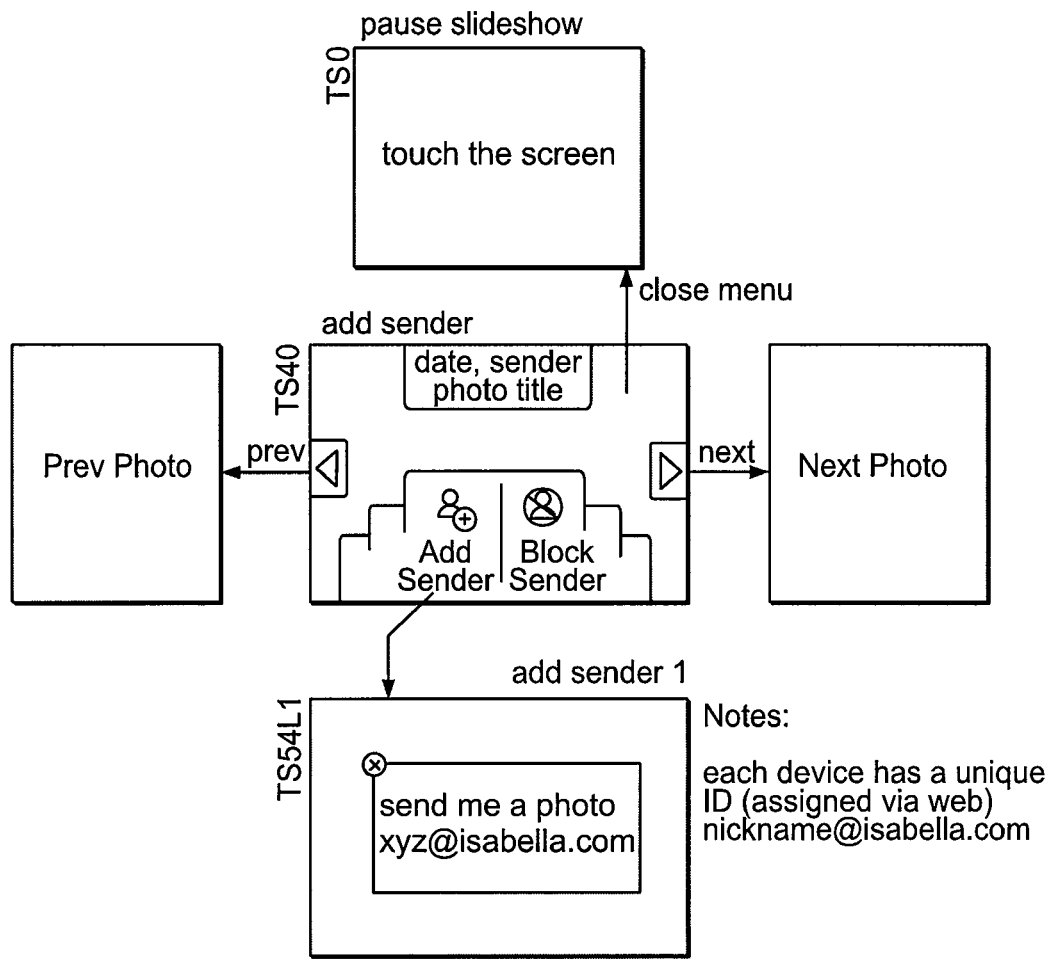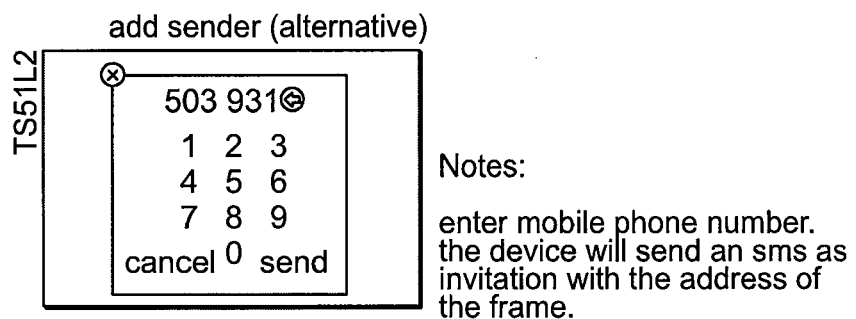
FIG. 18

SYSTEMS AND METHODS FOR MULTIMEDIA CONTENT SHARING

This is a continuation-in-part of U.S. patent application Ser. No. 12/186,498, entitled SYSTEMS AND METHODS FOR MULTIMEDIA CONTENT SHARING, filed Aug. 5, 2008 now abandoned, the teachings of which are incorporated herein by reference.

BACKGROUND OF THE INVENTION

The invention pertains to digital media and more particularly, by way of example, to systems and methods for multimedia content sharing. The invention has application, by way of non-limiting example, in the sharing of images and other multimedia content between and among family, friends and other communities.

Digital cameras, both still and video, abound. One can hardly step into the streets of any modern city without witnessing multiple cameras in use. This has proven increasingly true since the advent of ultra-portable digital and video cameras, not to mention camera-equipped cell phones. The trend is likely to continue as manufacturers incorporate even better cameras into the ubiquitous cell phone.

The advances that have led to the upswing in picture-taking have not found parallel in picture sharing. Most users resort to printing their favorite pictures and hand-delivering, or mailing, them to friends and family. Those on the information superhighway may use e-mail to send photos but, as many will attest, e-mail client incompatibilies, image reader problems, firewall limitations, and lacking computer skills often frustrate recipients attempts to enjoy the fruits of these missives. While online photo sharing services, such as MySpace®, FaceBook®, help overcome some of these problems, they introduce new ones—not the least of which is nessitating would-be recipients to log on to their computers to see the latest uploads. So goes the art of passive viewing.

Video sharing technologies are even more wanting. The lack of e-mail support for all but the smallest of video files requires users to "burn" them into CDs or DVDs and hand-deliver or mail them to proposective recipients. Still, incompatibilies in storage formats and disk-reader capabilities often frustrate these efforts, as well. Those with sufficient skills may turn to online video sharing services, such as YouTube®, BlipTV®, to avoid these problems only to find, like users of their still photo sharing service counterparts, that they have introduced new ones.

In view of the foregoing, an object of the invention is to provide improved methods and apparatus for image sharing.

Related objects are to provide such methods and apparatus as can be used with still images, moving images (video), audio files, and other forms of multimedia content.

Further objects of the invention are to provide such methods and apparatus as reduce the potential that hardware, software and/or format incompatibilies will frustrate content sharing.

Yet other objects of the invention are to provide such methods and apparatus as can be easily used by young and old, those that are computer-savvy and not, alike.

Still yet further objects of the invention are to provide such methods and apparatus as bring together families, friends and other communities.

Yet still yet other objects of the invention are to provide such methods and apparatus as permit the sharing not only of multimedia content but, also, user feedback surrounding that content.

SUMMARY OF THE INVENTION

The foregoing are among the objects attained by the invention which provides, in some aspects, a multimedia content sharing system including a shared content server that stores items of content (e.g., still images, moving images and audio files) and a plurality of nodes, each in communications with the shared content server via cellular telephone and/or other data networks. Those other nodes can be, for example, mobile phones, personal digital assistants, network-enabled digital picture frames, personal computers, third-party servers, and so forth.

The shared content server can transmit items of content to a first set of nodes "automatically," e.g., without requests by users of those nodes for the items. At least one node in that first set ("first peer node") displays the content of received items (e.g., on an LCD screen) and accepts user feedback in regard to them. That feedback is transmitted back to the shared content server for distribution to one or more other nodes (e.g., one or more "second peer nodes"), e.g., in the first set, which alter their own respective displays of the items accordingly.

Related aspects of the invention provide a system as described above in which the shared content server transmits the aforementioned feedback to one of the second peer nodes without the item of content with respect to which the feedback was accepted from the first peer node.

In still further related aspects, the invention provides a system as described above in which the feedback accepted by the first peer node with respect to an item of content includes commands for one or more of (i) copying the item to an album (or other collection), (ii) rotating the item on the display, (iii) requesting that another node (e.g., one or more of the second peer nodes) be blocked from presenting that item of content, (iv) requesting that a user or node responsible transmitting the item of content to the first peer node (via the shared content server) be blocked from transmitting further items of content to that and/or other nodes.

Other related aspects of the invention provide systems as described above in which the first peer node and/or other nodes in the first set store items of content received from the shared content server in respective local stores.

In other aspects, the invention provides systems as described above in which the first peer node alters its own presentation of items of content with respect to which the feedback was accepted, in addition to transmitting that feedback to the shared content server for distribution to other nodes. According to related aspects of the invention, the first peer node responds to selected interaction by a user of that node by (i) adding, deleting or otherwise changing information pertaining to an item presented by that node, and/or (ii) messaging and/or forwarding items of content to other nodes.

Further aspects of the invention provide systems as described above in which the shared content server transmits items of content to a second set of the nodes in the same manner as those transmitted to the first set of nodes, i.e., without requests by users of those nodes for the items. As with the first set, at least one node in the second set displays the content of received items, accepts user feedback in regard to those items, and transmits that feedback to the shared content server for distribution to other nodes in the second set of nodes.

According to further aspects of the invention, third-party server nodes in a system of the type above can include photo-sharing web sites, digital media companies, and/or other content repositories. Such node can, according to these aspects of the invention, provide items of content to the shared content server, for example, at the initiative of that third-party server, at the request of the shared-content server, and/or at a request of the user a node. Such third party server nodes can, instead or in addition, receive content from the shared content server, e.g., as in the case of a node used for a third-party photo printing service.

Further aspects of the invention provide systems as described above in which the shared content server comprises one or more servers that are coupled for communication via one or more networks. Each of those servers can have a central store with records and/or other structures that store items of content and related information, e.g., thumbnails, versions, and supplementary information such as time of acquisition of an item of content and/or its transmittal to the one or more servers.

Still other aspects of the invention provide systems as described above in which the one or more of items of content on the shared content server are provided by the first peer node. That node can acquire the item, for example, using a camera that is coupled to the node, and can transmit it to the shared content server for transmittal to the other nodes. In related aspects of the invention, the first peer node can acquire the item of content from a web site, networked computer, hard drive, memory stick, DVD, CD or other device or system, prior to transmitting it to the shared content server for transmittal to the other nodes.

Other related aspects of the invention provide systems as described above in which the shared content server combines items of content, e.g., received from the first peer node, with supplementary information provided with that item of content and/or in connection with its transmission from that node. That supplementary information can include, for example, information contained in a header (e.g., of an e-mail) provided with the item of content and/or contained in metadata provided with the item of content, all by way of example. The shared content server can transmit the supplementary information to other nodes, along with the item of content to which it relates.

In related aspects of the invention, the shared content server processes items of content received, e.g., from the first peer node (or other nodes) and/or supplementary information for those items of content. This includes generating, for example, "thumbnails" of the items of content and versions of those items optimized for presentation on one or more the nodes. That optimization can include, for example, cropping images, performing red-eye reduction and/or adjusting any of resolution, color, and contrast.

Further related aspects of the invention provide systems as described above in which processing by the shared content server includes tagging an item of content received from a node to facilitate categorization of that item into one or more sets (e.g., "albums"), e.g., defined by users of the nodes. This can can include tagging an item of content based on any of a user-supplied designation (e.g., album name), supplementary information provided with or for that item, and the content of the item itself.

Yet still other aspects of the invention provide systems as described above in which the shared content server transmits items of content to the first peer node and/or other nodes based on any of polling, scheduled transmission times, and/or sensed activity by a user of the respective node.

In other aspects, the invention provides systems as described above in which the shared content server transmits items of content to nodes based on the groups (e.g., albums) into which those items are formed and permissions by the nodes (or users of those nodes) in those groups. In related aspects, the shared content server forms those groups based on feedback received from the nodes in response to presentation of the items of transmitted content. Alternatively, or in addition, grouping can be based on user-defined rules, e.g., that are a function of tags or other information associated with the respective items of content.

In other aspects, the invention provides devices for multimedia content sharing having one or more features of the components of the systems described above. Thus for example, in one aspect, the invention provides a device for multimedia content sharing including a processor, a display that is coupled to the processor, where the processor (i) drives the display to present content of at least one item of content received from a shared content server, (ii) effects acceptance by the device of feedback with respect to that item of content from a user of the device, (iii) transmits that feedback to the shared content server for transmission to at least one other device to which that item of content was transmitted by the shared content server for altering that other device's presentation of that item of content.

In a related aspect, the invention provides a device as described above comprising a sensor that senses characteristics of any of (i) the device, (ii) an environment local to the device, and/or (ii) a user of the device. The sensor can be, by way of non-limiting example, a motion sensor, radio frequency identification (RFID) reader, bluetooth transceiver, photo-detector, network presence/characteristic sensor, microphone, touch sensor, proximity sensor, and/or camera.

According to further related aspects of the invention, the processor of a device as described above can respond to a sensed characteristic by (i) altering a state of the device, (ii) altering the presentation of an item of content by the device, (iii) generating and/or altering a user notification on the device, (iv) tagging an item of content, (v) generating a notification to the shared content server or to another device, (vi) sending an item of content to shared content server and/or another device, (vii) altering a prioritization of tasks by the device and/or the shared content server, and/or (viii) scheduling transmission of items of content.

In still other aspects, the invention provides methods of multimedia content sharing paralleling the operation of the systems and/or their components described above.

Other aspects of the invention provide a device, such as a computer-driven touch sensitive display, that facilitates operator selection of a function from among a plurality of functions. The device comprises a processor that is coupled to a display and that presents, utilizing a first format, (i) a limited subset of function-selection icons selected from a set of such icons, each of which is associated with one or more of the aforesaid functions and/or a differing display of options, (ii) one or more menu-index icons. The processor responds to user selection of one of the menu-index icons by repeating the display, albeit with a varied—but, again, limited subset of the function selection icons. Conversely, the processor responds to user selection of at least some function-selection icons for effecting a function associated therewith.

Related aspects of the invention provide a device as described above in which the processor responds to user selection of selected function-selection icons by driving the display to present function selection options in a format that differs from the first graphical format, described above.

Further related aspects of the invention provide a device as described above in which the set of function-selection icons is large compared with the available space on the display for presenting such icons; whereas the number of icons in each subset is small in comparisoni to that space. Thus, for example, the set of function-selection icons can be ten or larger and, more preferably, fifteen or larger and, still more preferably, twenty or larger, while the subsets of function-selection icons is five or smaller and, more preferably, three or smaller and, still more preferably, two or smaller.

Still other related aspects of the invention provide a device as described above in which the processor's response to user selection of menu-index icons effects a carousel-like indexing through the set of function selection icons—albeit in groupings of the subsets described above.

Still other aspects of the invention provide a device as described above in which the processor drives the display to present one or more specified screens.

In other aspects, the invention provides a user interface and methods of function selection paralleling the operation of the devices described above.

Still further aspects of the invention are evident in the drawings and in the discussion and claims that follow.

BRIEF DESCRIPTION OF THE DRAWINGS

A more complete understanding of the invention may be attained by reference to the drawings, in which:

FIG. 2 depicts storage of image and other information on a server of the type shown in FIGS. 1A-1B;

FIGS. 10-30 are wireframes depicting a sequence of screens of a user interface according to the invention of the type utilized on the content presentation devices of FIGS. 4-5.

DETAILED DESCRIPTION OF THE ILLUSTRATED EMBODIMENT

Architecture

Figures 1A, 1B:
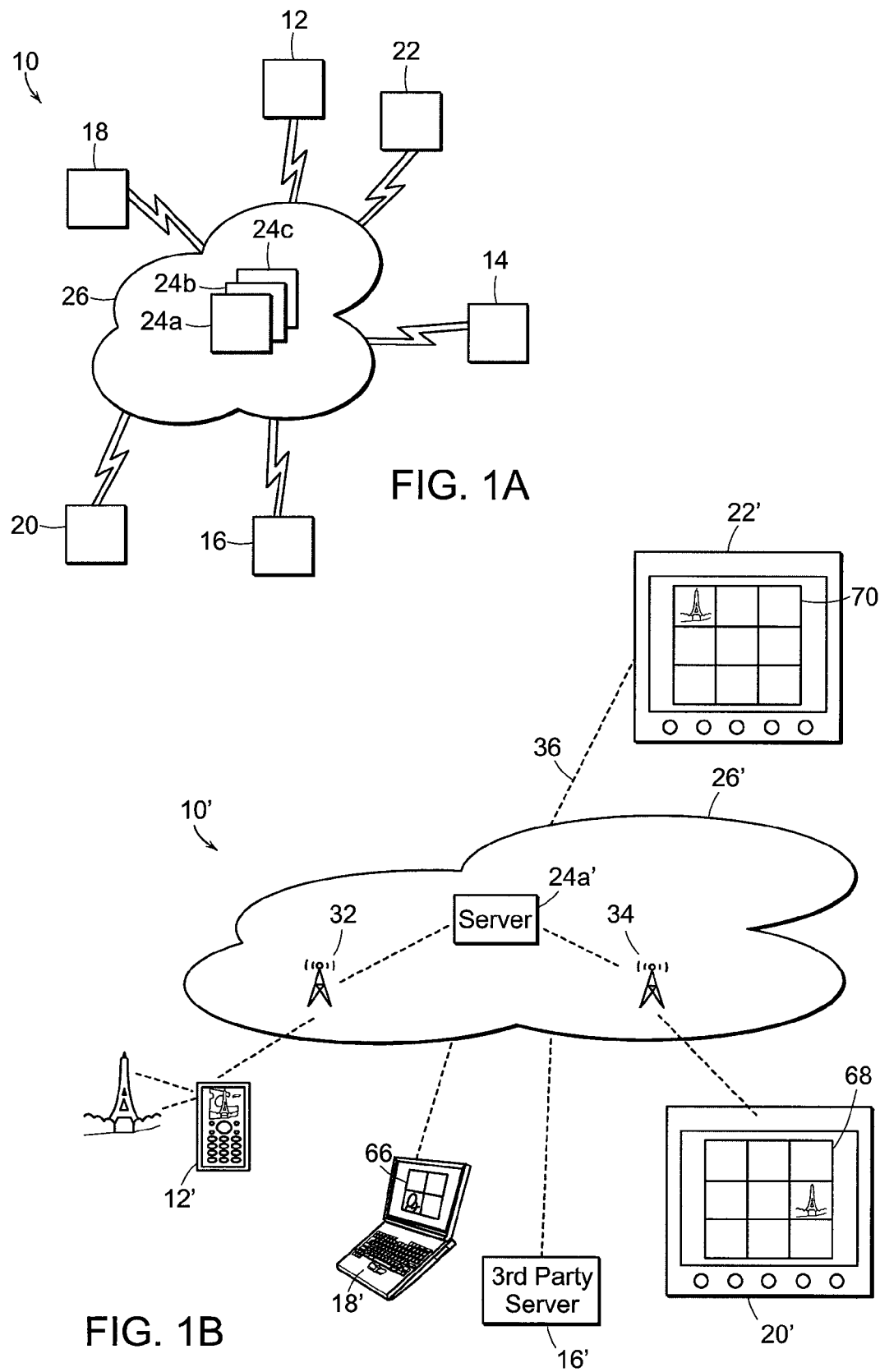
FIGS. 1A-1B depict a multimedia content sharing system according to the invention.

FIG. 1A depicts a multimedia content sharing system 10 according to one practice of the invention. The system 10 includes a plurality of content sharing nodes 12-22 coupled with one another and with servers 24a-24c ("shared content servers") via a network 26. Content handled by the system includes still images, moving image sequences (such as video), and audio data. That content can also include text data, notifications, events, and other information.

Nodes 12-22 comprise one or more electronic devices or systems that (i) communicate with one another and/or with the servers 24a-24c and (ii) present, acquire and/or provide content. These include, by way of non-limiting example, mobile phones, personal digital assistants, network-enabled digital picture frames, personal computers, third-party servers or server systems, all of the type commercially available in the marketplace as adapted in accord with the teachings hereof. One or more of the nodes can also be content presentation devices ("CPDs") of the type described more fully elsewhere herein. It will be appreciated that while individual examples of such devices are shown in the illustrated embodiment, other embodiments may incorporate less or more of such devices.

Illustrated content sharing servers 24a-24c aggregate, processes and/or serve multimedia content from and/or to one or more of the nodes 12-22. The servers 24a-24c comprise personal computers, workstations, or other digital data processing devices of the type commercially available in the marketplace as adapted in accord with the teachings hereof. The servers 24a-24c, which may be coupled for communications with one another over the network 26, may be collocated, distributed or otherwise.

Network 26 provides communications coupling between the servers 24a-24c and/or nodes 12-22. The network 26 can include one or more cellular networks, one or more Internets, metropolitan area networks (MANs), wide area networks (WANs), local area networks, personal area networks (PANs) and other networks, wired, wireless, terrestrially-based, satellite-based, or otherwise, known in the art suitable for transport of digital content, data and commands in accord with the teachings hereof.

FIG. 1A and the discussion above overview an example of the architecture with which the invention is practiced, other configurations of which fall within the scope thereof. Thus, for example, although a plurality of nodes 12-22 are shown in the drawing, it will be appreciated that the invention can be practice with a single node. Moreover, although the nodes 12-22 are shown coupled to three servers 24a-24c, it will be appreciated that the invention can be practiced with less or more servers, as well as without any servers.

A further appreciation of the invention may be attained by reference to the embodiment shown in FIG. 1B. The system 10', shown there, comprises mobile phone 12', personal computer 18', CPDs 20', 22', and third-party server 16' that are coupled for communications with server 24a' via network 26'. Primes are used in the reference numerals of FIG. 1B and in the discussion that follows to illustrate, by way of non-limiting example, types of devices that may be used for particular ones of the nodes 12-22, server 24a and network 26 of FIG. 1A, as well as the methods of operation thereof and/or manners of interaction therebetween (again, in an illustrative, non-limiting sense). It will be appreciated that other devices may be used in practice of the invention, instead of or in addition to those shown in FIG. 1B, and that the methods of operation and/or manners of interaction discussed below in connection FIG. 1B may apply to other devices and/or configurations, as well.

The third-party server 16' comprises a photo-sharing web site, a digital media company, and/or other repository of content. It may provide images and other multimedia content to the server 24a' automatically (on action of the server 16'), at the request of the server 24a', and/or at the request or behest of a user of server 16' and/or one or more of the nodes 12', 18', 20', 22'. In some embodiments, server 16' may receive images and other multimedia content from the shared content server, e.g., as in the case of a printing service invoked at the behest of users of nodes 12', 18', 20', 22' to generate hardcopy of images.

The network 26' comprises one or more cellular and/or other networks 32-36 providing communications coupling between server 24a' and, respectively, mobile phone 12' and CPD 20', as shown. The network 26' also comprises Internet backbone (not shown) providing communications coupling between server 24a' and the cellular networks 32, 34. The network 26' (and its constituent components) are operated and utilized in the conventional manner known in the art, as adapted in accord with the teachings hereof.

Operation

Content Acquisition and Upload

With continued reference to FIG. 1B, in operation of the illustrated embodiment, images (and other multimedia content) are provided by the nodes 12'-22' to server 24a'. That content, which may be in the form of images or other multimedia content, may be acquired by the nodes in various ways. Thus, by way of non-limiting example, (a) the mobile phone 12' can acquire images via a built-in camera and can transmit those images to the server 24a' via network 26' and/or, more particularly, cellular network 32; (b) the personal computer 18' can acquire images via a built-in or attached camera and/or via downloading from other devices/systems (e.g., web sites, networked computers, hard drives, memory sticks, DVD/CDs, and so forth) and can transmit those images to the server 24a' via network 26' (e.g., via IP network, cellular network or otherwise); (c) the third-party server 16' can transmit images to server 24a' automatically and/or at the request of a user; and, (d) CPDs 20', 22' may transmit images contained in memory "sticks" (or other storage media) to the server 24a' via network 26' and/or, more particularly, via cellular network 34 and/or IP network 36.

In the illustrated embodiment, interfaces are provided that facilitate the transmission of images (and other content) from the nodes 12'-22' to the server 24a'. Those interfaces include "widgets," "wizards," applications and other special-purpose programs that can be executed by users of the nodes 12'-22' to perform such transmission, e.g., on on-demand, scheduled or other bases. Such programs can be of the type conventionally used in the art to transfer images from client devices to server devices as adapted in accord with the teachings hereof. The interfaces also include general-purpose file transfer programs, such as (by way of non-limiting example) those suitable for ftp-, http-, e-mail-, or MMS-based transfers to server 24a'. Graphical user interfaces for use with the foreing are described in further detail below.

Content Processing

The server 24a' aggregates the received images with supplementary information provided, e.g., by the mobile phone 12' and/or in the transmission process. This can include, by way of non-limiting example, "header" information contained in the e-mail or MMS transfer, such as, sender identification, time and date of transmission, subject line, message body, and so forth. This can also include metadata provided with the image itself, e.g., device identification, time and date of capture, aperture settings, and so forth.

The server 24a' also processes the image and supplementary information, e.g., for transmission to the nodes 12', 18', 20', 22'. This can include generating thumbnails and/or optimized versions of the image for display or other presentation on the nodes. Those optimized versions can incorporate resolution reduction/enhancement, color reduction/enhancement, contrast reduction/enhancement, cropping, red-eye reduction, and other adjustments known in the art of image display.

Processing can further include tagging the images, for example, in accord with the supplementary information and/or in accord with designations made by a node user. In some embodiments, tagging can also be based on image content (as determined, for example, by facial or other recognition algorithms). In the embodiment illustrated in FIG. 1B, tagging allows and/or reflects categorization of the images into sets defined by one or more of the node users.

Referring to FIG. 2, the server 24a' stores the aforementioned image and other information in a central store 38, which is based on database management, content management or other data storage technology known in the art, as adapted in accord with the teachings hereof. Contained in illustrated store 38, by way of non-limiting example, are records and/or other database structures storing or otherwise reflecting, for each image, related "image information"—i.e., the image 40 itself, its thumbnail 42, image versions 44, 46, supplementary information, e.g., regarding acquisition of the image and/or its transfer to the server 24a' (such as, for example, sender identification (ID) 48, time/date of transmission 50 from the creator of the image to the server 24a', subject line 52 of an e-mail or other transmission by which the image was sent to the server 24a', message body 54 of an e-mail or other transmission by which the image was sent to the server 24a', device ID 56 of the equipment that acquired the image, file name 58 containing the image, time/date of image capture 60, aperture settings 62 via which the image was captured, among other things) and tags 64. In other embodiments, other information may be contained in the store 38, instead or in addition.

Referring back to FIG. 1B, the server 24a' can obtain images and other image information from the third-party server, e.g., as an added service to users of the devices 12', 18', 20', 22'. This can include images and other image information, as well as other digital content.

Content Distribution and Presentation

The server 24a' transmits image information to the nodes. Preferably, this is done "automatically," i.e., without need for request by the users of those nodes for those images. For example, in a preferred embodiment, once CPDs 20', 22' have been activated (e.g., powered-on and coupled to a cellular network), the server can download selected images to those devices 20', 22' e.g., via networks 34, 36, without further action by the respective users of those devices. The "selected" images can be, for example, those contained in albums to which respective users of the devices 20', 22' have permissions, as discussed below. Transmission of the images by server 24a' to the CPDs 20', 22' can be on polling, at scheduled transmission times (e.g., midnight every week day), when sensors in the respective devices 20', 22' sense user activity (or lack thereof), and so forth. In some embodiments, transmission to CPDs can also be on user request—e.g., where CPDs are so configured and enabled. The server 24a' can similarly transmit optimized images and, optionally, other information to the mobile phone 12', computer 18', e.g., upon user log-in or other request to the server 24a' via a web browser, dedicated client or otherwise, on polling or other requests and/or at scheduled transmission times. The server 24a' selects optimized images for transmission to each target node based on the characteristics of that node.

The nodes 12', 18', 20', 22' present images individually and/or in groups, e.g., based on characteristics such as tags, sender, subject, time/date of image acquisition. The drawing depicts presentation of "albums" of images 66, 68, 70, here, shown by way of non-limiting example as image grids, on devices 12', 18', 20', 22', respectively.

In addition to presenting the image information, one or more of the nodes can acquire and/or otherwise provide images. Thus, as shown in the drawing and discussed above, mobile phone 12' can acquire an image that it, then, transmits to the server 24a'. This is likewise true of portable computer 18', e.g., via a built-in or attached camera. These and other nodes can, instead or in addition, transmit to the server images acquired by other means (e.g., images downloaded from other devices/systems, generated images, and so forth). While, in some embodiments, CPDs are equipped only for content presentation, in other embodiments, they may also acquire (e.g., via a built-in or attached camera) or otherwise provide images (e.g., downloaded or otherwise obtained from other devices/systems).

Albums & Communities of Users

As evident in the discussion above, images and other multimedia content can be transmitted to the nodes 12'-22' based on groupings referred to, by way of non-limiting example, as "albums." Membership of an image in an album may result in any of one or more ways, for example, (i) based on ad hoc assignment of individual or groups of images (or other content) by users to a pre-existing or new album, and/or (ii) based on rules that are defined by users, by default, or otherwise, that effect assignment of images (or other content) as a function of tags and/or other image information. In regard to the fomer, by way of non-limiting example, users of the nodes may utilize the user interface, e.g., of CPD 20' (and, likewise, those of the other nodes) to copy images or other items of content to albums and, thereby, to effect system-wide assignment of those images (or other content) to those albums. In regard to the latter, by way of non-limiting example, the server 24a' can assign newly acquired images to a default album, such as "ALL" or "NEW IMAGES", etc.

However, in the illustrated embodiment, not all images that are members of an album are necessarily presented on all nodes 12'-22'. Instead image presentation is a function of permissions and preferences. Particularly, server 24a' transmits to (or otherwise permits display on) the nodes 12'-22' only those images to which the node has permission (e.g., by way of hardware and/or user authentication). Such permissions may be granted, for example, by default, as a consequence of payment of a service fee, activation of a user account, action of a node user, e.g., via a user interface of the type described below, action of an administrator, e.g., using a web site or other interface to the server 24a, and so forth. The obverse of such actions may, conversely, effect recision of such permissions.

In addition, in some embodiments, the server 24a' will not transmit to (or permit display on) a node, images from which that node has been blocked or excluded (e.g., by act of the image creator/sender or otherwise)—even though those images may form part of an album to which the node has permission. Thus, for example, the user of a node that acquires or otherwise provides images (or other content) for a given album may block or exclude the user of another node from viewing those images—yet, not exclude users of other nodes from the same album. This may be effected, for example, by action of a node user, e.g., via a user interface of the type described below, action of an administrator, e.g., using a web site or other interface to the server 24a, and so forth.

Images received by the nodes 12'-22' from server 24a' may be presented to the respective users of those nodes, for example, depending display preferences set for those devices 12'-22', e.g., by default, user action or otherwise. Thus, for example, one node may be configured to present all images transmitted to it by the server 24a', while another node may be configured to present only newly received images, while yet another node may be configured to present only images that are members of selected albums, and, yet, while still another may be configured to block images from selected senders, nodes and/or selected albums. Still further, some of these nodes may be configured to present received images in groups or batches (e.g., album "grids" of the types shown, by way of non-limiting example in FIG. 3), while others may be configured to present images individually, in random or other sequences. Such display preferences may be effected action of a node user, e.g., via a user interface of the type described below, action of an administrator, e.g., using a web site or other interface to the server 24a, and so forth.

In the illustrated embodiment, membership of an image in an album is reflected by tags 64 (see FIG. 2) or other image information associated with the image, e.g., in store 38. Exclusions can be similarly reflected (i.e., by tags or other image information.) In other embodiments, album membership may be reflected in other ways, e.g., by separate "album" tables, linked lists of album membership, or otherwise.

Figure 3:
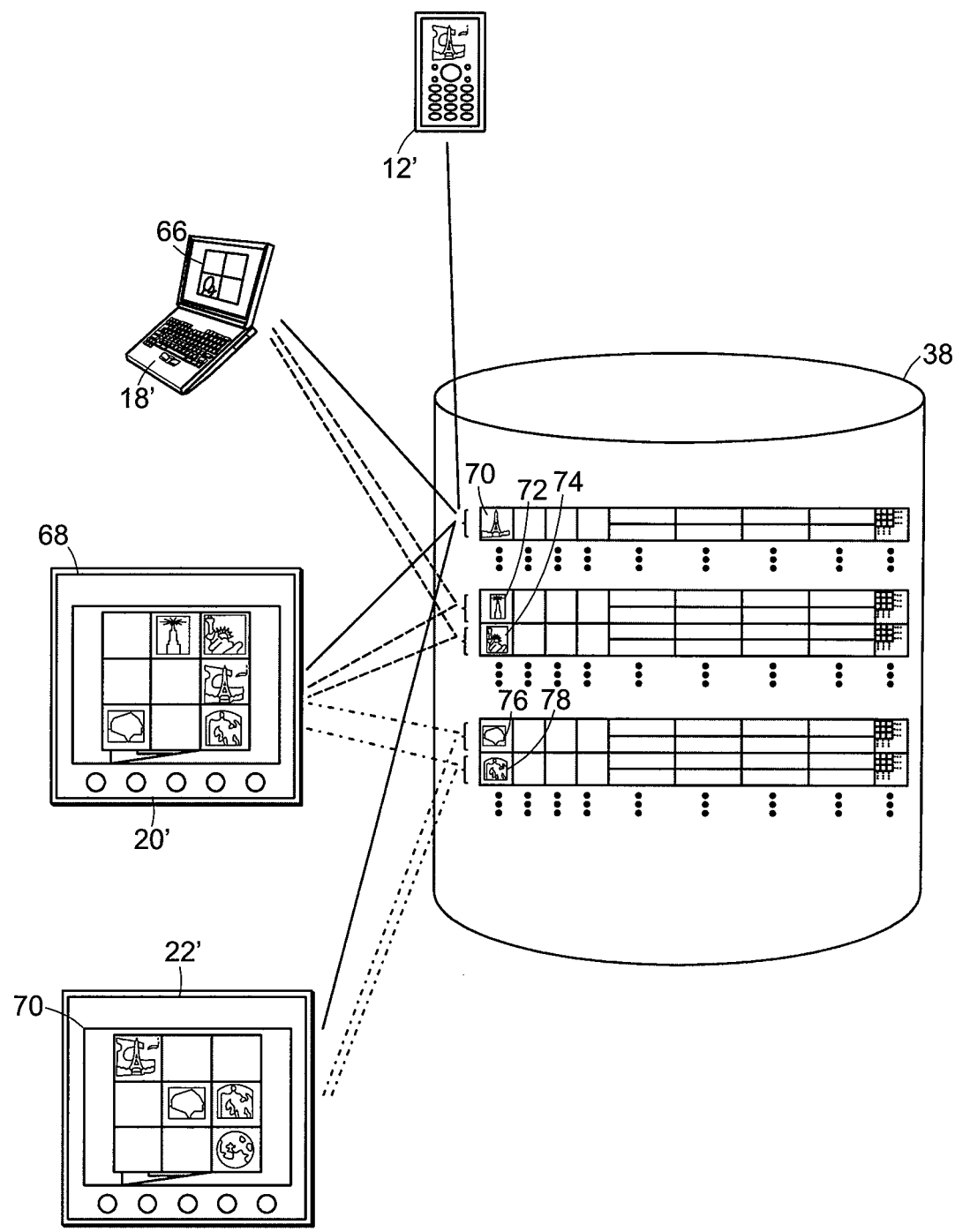
FIG. 3 depicts further details regarding storage of records in a server of the type shown in FIGS. 1A-1B in support of the sharing of images between and among nodes.

The foregoing provides a mechanism for sharing of images between and among users of nodes 12'-22' and, thereby, to form "communities." This is illustrated, by way of example, in FIG. 3, which depicts records of store 38 for each of five images 70-78 which, together, form three albums that are transmitted in varying combinations (e.g., in varying sets that may overlap, partially or completely) to the nodes 12'-22' for presentation. This is graphically reflected by groupings of the records in the drawing, as well as by varying solid and dashed lines in the drawing. In practice, album membership is effected by tags 64 associated with each respective image's record in the store 38 and/or by other image information.

Referring to the drawing, image 70 of the Eiffel Tower forms at least part of a first album to which all nodes have permission. Indeed, as shown in the drawing, the various nodes' preferences are set such that image (or one of its versions 44, 46) is displayed on each node. Image 72, of the Seattle Space Needle, and image 74, of the Statue of Liberty, form at least part of a second album to which only nodes 18', 20' have permission, as reflected by dashed lines in the drawing. Although the drawing shows both images on display in both nodes 18', 20', the preferences on one or both may be set so as to delay and/or prevent such display for either or both images. Image 76, of a tree at sunset, and image 78 of the Lincoln Memorial, form at least part of a third album to which nodes 20' and 22' have permission. Again, although the drawing shows both images on display in both nodes 20', 22', the preferences on one or both may be set so as to delay and/or prevent such display for either or both images.

User Interaction with Nodes

In addition to presenting content, nodes 12', 18', 20', 22' (and, in some embodiments, node 16') accept user input for (i) manipulating or otherwise altering images and image information presentation, (ii) adding, deleting or otherwise changing image information, including image tags, (iii) replying to and/or otherwise messaging other users (e.g., an image sender) or other nodes (e.g., a third-party server), via the server 24a', (iv) forwarding, via the server 24a,' images and image information to other nodes, e.g., devices 12', 18', 20', 22' (for viewing by their respective users) or servers 16' (including, for example, a server used by a printing service), all by way of non-limiting example. A further appreciation of this may be attained, by way of non-limiting example, by reference to the discussion of the graphical user interface, below and elsewhere herein.

The user input can be reflected in presentation of images and information at the node in which the input was made. By way of scheduled, user-initiated or other synchronization operations, changes effected by the user input (or other feedback with respect to displayed images, or other content) may also be reflected in presentation of those same images (or other content) on the other nodes. For example, rotation of an image resulting from input by a user of node 22' may be synchronized to the server 24a' and, thereby, may be reflected in presentation of that image in corresponding albums 66, 68 on devices 18', 20', respectively. This is true, likewise, of assignment of an image to an album (e.g., via a "copy to album" operation utilizing the user interface), rotating or otherwise an image (e.g., via a "rotate" operation utilizing the user interface), tagging an image as a favorite (e.g., via a "tag as favorite" operation utilizing the user interface), changes to image information, including tags, made by the user of node 22' vis-a-vis images depicted on the other nodes 18', 20'.

On the other hand, replies and/or other message sent by the user of node 22' to mobile phone 12' and identified as private (either by that user, by default, or otherwise) are presented on device 12' (and not necessarily on the other nodes). Still other user input may be reflected solely on the device on which it is made.

The server 24a' can aggregate, process, store, transmit other multimedia content—e.g., moving image sequences (such as video), text messages, audio data, notifications, events, and other information—in the same manner as that discussed above and shown in FIGS. 1B and 2 with respect to still images. Likewise, suitably configured nodes 12'-22' can present such other multimedia content, in addition to accepting user input of the nature discussed above (e.g., vis-a-vis manipulating content and information, adding/deleting/changing such information, replying/messaging content providers, forwarding such content and information, and so forth).

Environmental Awareness

Characteristics of the nodes 12'-22', environments local to those nodes, and/or users thereof, can be determined by direct communication/interaction with sensors on those nodes, by inference, e.g., based on time, date, and node location, and/or by a combination thereof. The nodes 12'-22' and/or server 24a' can use these characteristics to (i) alter the state of the node(s), (ii) alter the presentation of content, (iii) alter user notifications, (iv) tag content residing on the respective node and/or transmitted by it to the server 24a', (v) generate notifications (or send content) to users of other nodes, (vi) alter prioritization of tasks by the respective node, and/or (vii) schedule transmission of images (or other content) from the server 24a' to the nodes 12'-22' (or vice versa).

Thus, one or more of the nodes 12'-22' may include (but are not limited to) one or more of the following sensors:

motion sensor
radio frequency identification (RFID) reader
bluetooth transceiver
photo-detector
sensors to determine presence and/or characteristics of network(s) to which node may be coupled
microphone (audio)
touch sensor
proximity sensor (e.g, infrared)
camera (still or video)

In some embodiments, such sensors are used to identify the presence or absence of a (possibly specific) user, and/or provide date and/or time specific feedback or content to the user, e.g., as discussed (by way of non-limiting example), below:

(i) In some embodiments, for example, a photo-detector present on a node, e.g., 20', can be used by logic on that node to determine ambient lighting and, thereby, to effect screen dimming (or brightening). Likewise, a motion sensor on that node can be used to detect the presence of a user at the node 20' and, thereby, switch among display modes (e.g., image display mode, clock display mode, display-off mode).

(ii) In some embodiments, one or more of the nodes, again, for example, node 20', includes one or more of the foregoing sensors that enable it to determine the identity of a user. That information can be used for, or in connection with, the tagging discussed above. Logic on the node can also use this information to alter the content and/or associated notifications that the node presents to a specific user. For example, a user can be presented with images and/or albums specific to him and/or can be notified and presented with newly arrived images (or other articles of content). Alternatively or in addition, the node can generate user-specific alerts (e.g., to take medications, walk the dog, see the doctor and so forth, based on information provided at set-up, by the server, by preconfiguration, or otherwise) and/or can generate notifications to the server 24a' and/or the other nodes indicating that the user is present.

(iii) In some embodiments, logic on one or more of the nodes, for example, node 20', determines node location, the local time of day, date, and so forth, via data available from servers on the network 26', or otherwise. The node and/or server 24a' can use this information for, or in connection with, the tagging noted and discussed in (iv) above. Logic on the node and/or server 24a' can also use this information to alter (i) the state of the node, (ii) the presentation of images (or other content) thereon (e.g. only "new" or recent content), (iii) associated notifications that the node presents to users, such as, weather forecasts, birthday reminders, missing child (e.g., "Amber") alerts, shopping or vendor-specific notifications (e.g., advertising), and so forth.

(iv) In some embodiments, one or more of the nodes, e.g., node 20', includes a touch sensor, motion sensor and/or proximity sensor that is used, for example, to gauge user interest in a particular image (or other article of multimedia content) presented by that node and to tag that image (or other article of content) accordingly. For example, if the node 20' detects a user's touch during display of a particular image (or other article of content) and/or album, that image or album can be tagged as a "favorite" or otherwise. This tag can be retained on the node to alter further presentation of that image or album (e.g., increasing frequency of presentation). The tag can also be transmitted to the server 24a' for recording in store 38 for statistical purposes, archival purposes, and/or to alter presentation of that image or album on other nodes. In this latter regard, for example, user interest in an image detected in the foregoing manner can be conveyed to other nodes to which that image is transmitted and presented as part of an album (or otherwise), thereby, alerting other users to the level of interest in that image.

(v) In some embodiments, logic on a node, e.g., 20', can detect user interaction (e.g., via one or more of the foregoing sensors) and can generate notifications (or send content) to users of other nodes, such as to reply to the sender of an article of content, forward content to a user at another node, place an order to purchase a hardcopy article of content, or "block" the sender of an article of content from sending any further content to a node.

(vi) In some embodiments, the server 24a' and/or respective nodes can detect node and/or network activity and can adjust prioritization of tasks accordingly, e.g., suspending the download of images during user interaction with a node.

Content Presentation Devices (CPDs)

Figure 4:
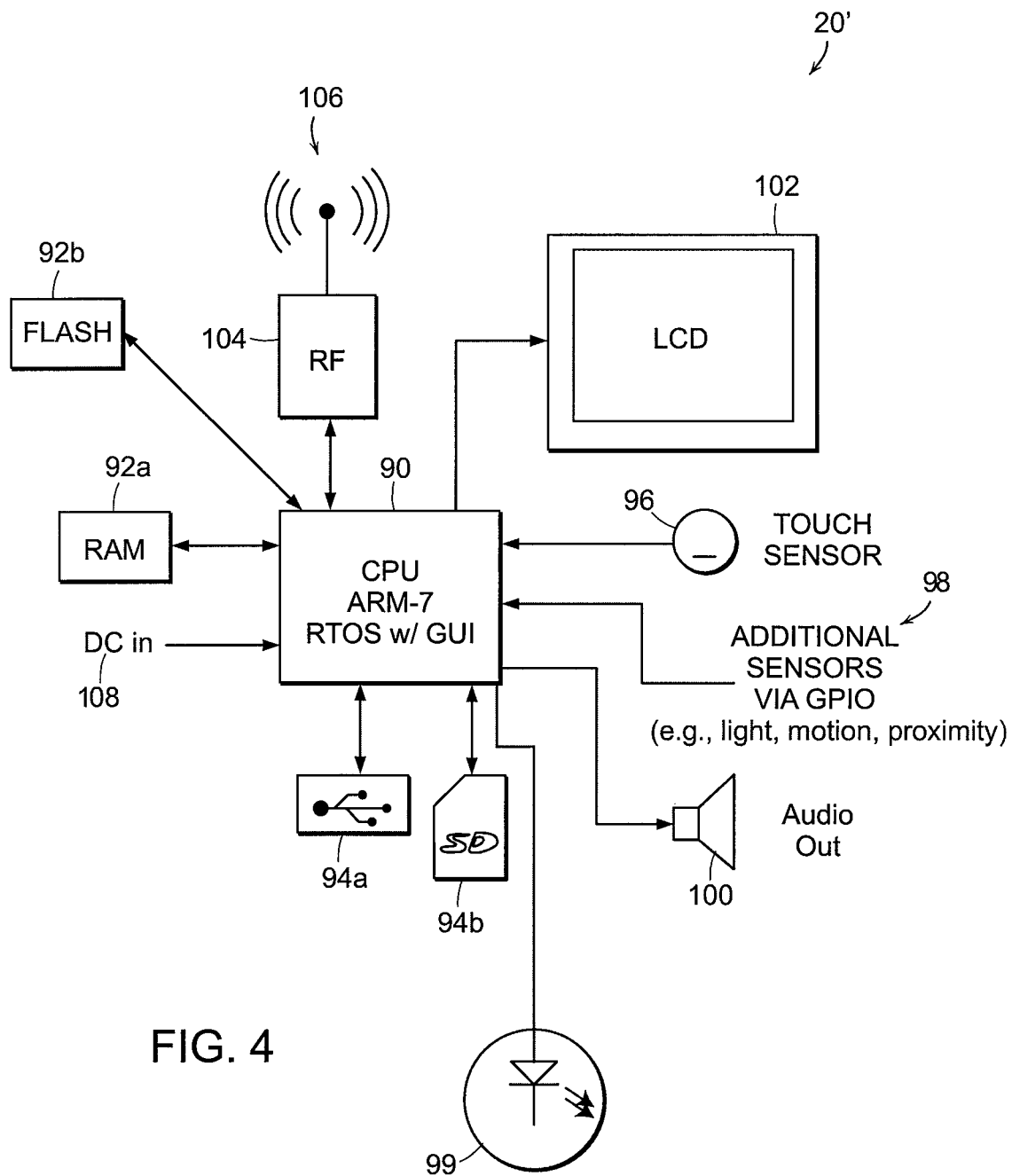
FIGS. 4-5 depict content presentation device according to the invention.

FIG. 4 is a high-level schematic of a content presentation device ("CPD") 20' according to one practice of the invention. CPD 22' of the illustrated embodiment similarly configured. In other embodiments, one or both of CPDs 20', 22' may be configured otherwise, e.g., incorporating lesser, more and/or other components than shown and described here. Referring to the drawing, the CPD 20' of the illustrated embodiment includes a processor (or CPU) 90, memory (RAM 92a, and a separate FLASH 92b for the local store (similar to 38)) 92, I/O ports 94a, 94b, touch input sensor 96, additional sensors 98, visual output 99, audio output 100, display (e.g., LCD) 102, cellular modem (RF) 104, antenna 106, and power supply (e.g., DC) 108, coupled as shown. The make-up of these components, for illustrative purposes and by way of non-limiting example, is provided in the listing below:

PROCESSOR 90
  for example, ARM or similar architecture processor, preferably, with on-chip graphics accelerator, such as Freescale MX31. The processor 90 executes software for operating the CPD 20' and, more particularly, the components thereof 90-108 in accord with the discussion of node and CPD operations above. Such software can be created, e.g., in C, C++, Java, Flash, or other conventional programming languages known in the art, utilizing conventional programming techniques, as adapted in view of the teachings above.
INTERNAL MEMORY 92
  for example, DDR RAM for use by processor 90 and FLASH for on-board content storage
I/O PORTS
  for example, SD memory expansion slot 94*b* and USB 94*a*
TOUCH SENSOR INPUT 96
  for example, touch-screen, and/or touch-sensitive soft keys, such as capacitive and/or resistive touch sensors
OTHER SENSORS 98
  for example, Light (photodetector), infrared motion, infrared proximity, position (e.g., tilt switch for landscape/portrait orientation)
VISUAL OUTPUT 99
  for example, one or more LEDs for providing user feedback (e.g. power, network activity, etc.)
AUDIO OUT 100
  for example, a single (monophonic) internal speaker
DISPLAY (LCD) 102
  for example, TFT LCD
RF MODULE 104
  for example, UMTS/GSM/CDMA
ANTENNA 106
  for RF communication with cellular network
POWER SUPPLY 108
  for example, an external AC-DC adapter, and/or Internal battery (Li-Ion)

Figure 5B:
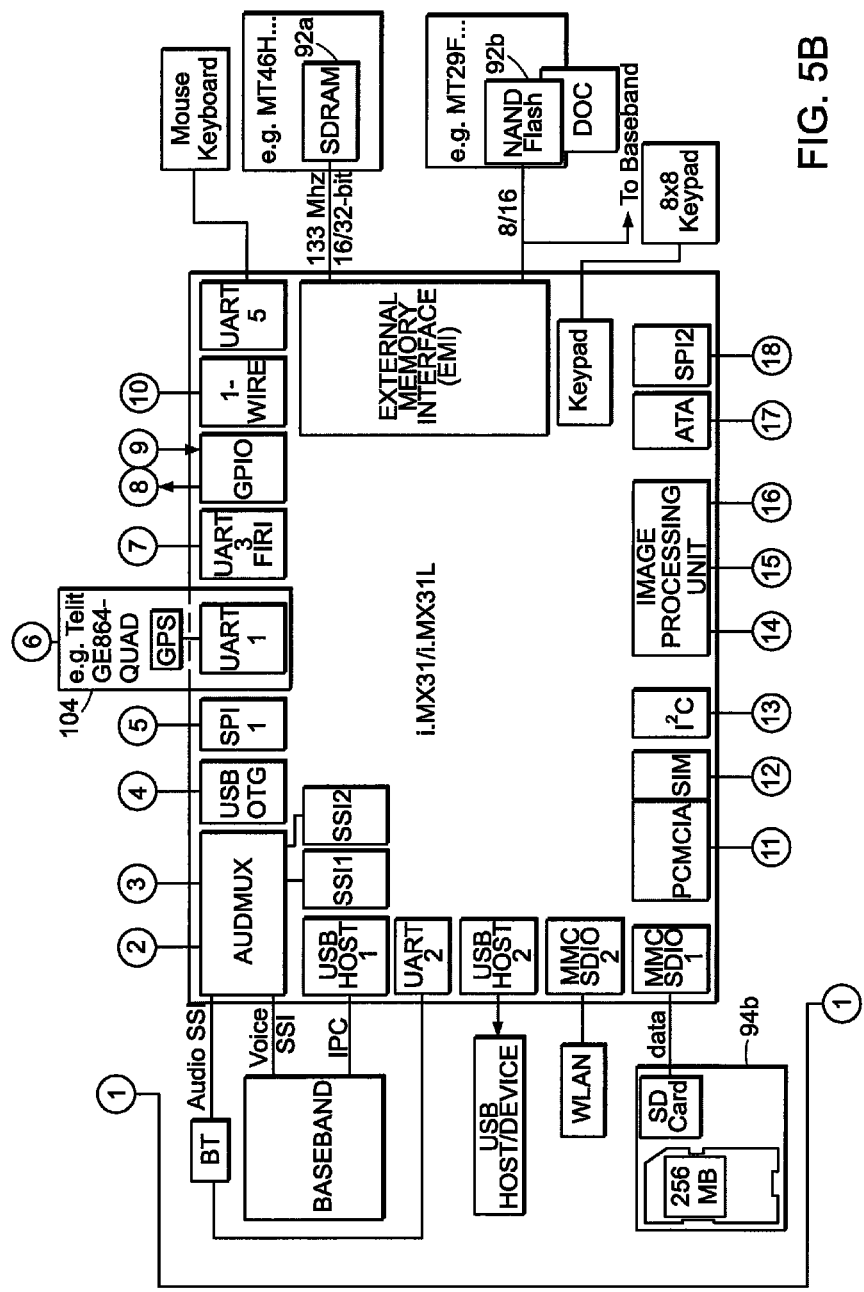
Figure 5C:
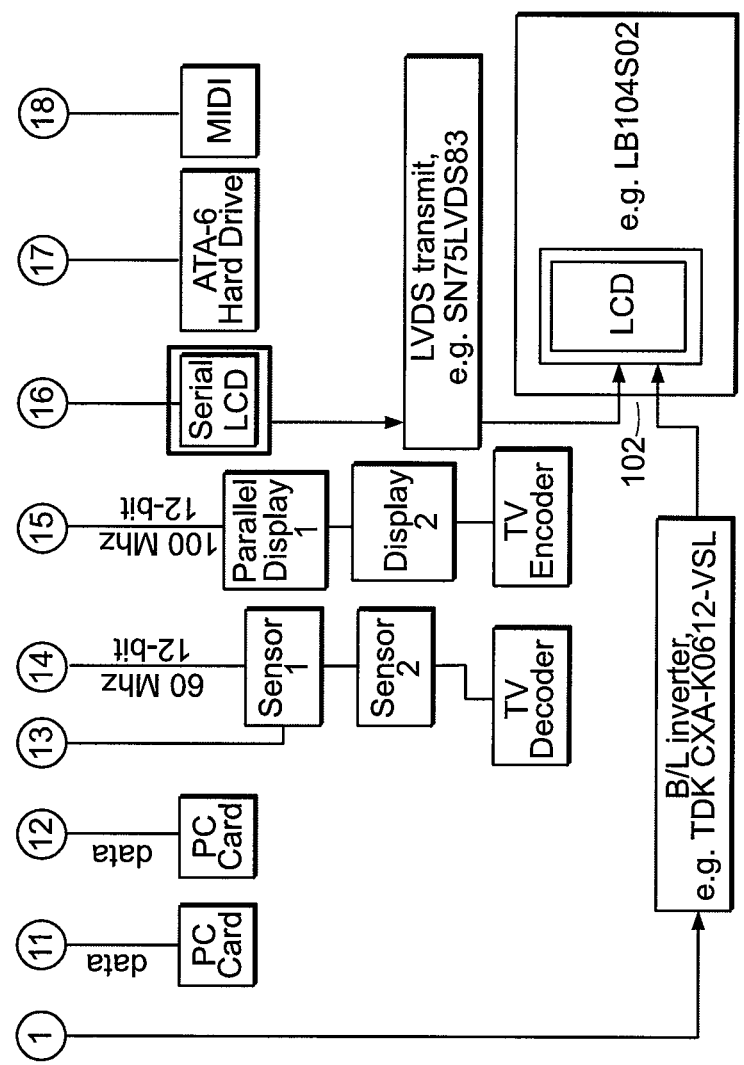

FIG. 5 is a schematic depicting further illustrative non-limiting details of an implementation of FIG. 4, including component selections of the CPD 20' (and CPD 22').

Of course, it will be appreciated that the schematics shown in FIG. 4 and FIG. 5 merely represent some embodiments of a CPD according to a practice of the invention and that other embodiments may utilize varying configurations and/or component selections.

User Interface

Like the other nodes, CPD 20' (and 22') can accept user input, e.g., for manipulating or otherwise altering images and image information presentation, addition, deletion or otherwise changing image information, including image tags, and so forth (see the discussion above under the heading "User Interaction"). To facilitate this, the CPD 20' employs a user interface ("UI") that provides, inter alia, for navigation of/interaction with images (and other multimedia content) and for setting device CPD 20' characteristics/modes.

That UI, which is implemented by CPU 90 operating in conjunction with display 102 and touch sensor 96 (among other components of the device 20') in the conventional manner known as adapted in accord with the teachings hereof, is activated when the user initiates contact with the device 20', e.g., via its touch screen 96', though, in other embodiments, the UI can be activated in other ways (e.g., upon sensing motion in vicinity of the device, upon device start-up, periodically based on timing, or so forth). Such activation interrupts/pauses any slideshow or content presentation on an active device 20' (or wakes an inactive device 20') and opens a menu option with which the user can interact.

In some embodiments, CPU 90 (operating in conjunction with display 102, touch sensor 96, and other components of the device 20') effects a UI that displays a hierarchical menu of user-selectable graphical or textual icons (hereinafter, "function-selection icons"), each of which is associated with one or more functions. The menu is referred to as "hierarchical" because, while user selection (e.g., via touch sensor 96) of some of those icons results in invocation of the respective associated function, user selection of others of those icons results in display (or activation) of plural additional icons, at least one of which must be selected by the user to invoke a function.

In practice, CPU 90 invokes a function selected by the user via the menu by calling a software routine and/or activating a hardware component (92-108) to execute the requisite operations. This is done in the conventional manner known as adapted in accord with the teachings hereof. Invokable functions in the illustrated embodiment include, though other embodiments may provide lesser, greater and/or other functions:

1. navigation/interaction
    a. find/view subset of content
        i. thumbnail directory of all content on-board device (inc. access to archived/deleted content)
            1. select image via thumbnail
                a. display full-size image for N sec
                    i. access "organize" menu
        ii. playlist (e.g. new, all, favorites, album (or shared album))
            1. create a playlist (subset of all images on device) by selecting (common) attribute(s)
                a. time period
                b. user-tagged favorites
                c. album (provision for >1 albums)
                    i. pre-defined albums
                    ii. shared albums
    b. organize
        i. keep
            1. tag as favorite
            2. copy to album . . . (i.e., tag or otherwise identify as belonging to album . . . )
        ii. delete
            1. delete from device
            2. and block sender
            3. undelete (retrieve from server)
    c. social action
        i. reply
            1. select from pre-defined replies
        ii. forward/share
            1. select from list of contacts—manage alphabetically
                a. other contacts added via server
            2. included in contact list is album(s) shared by group of users
    d. commerce/transaction
        i. print
            1. single print (purchase/order now)
            2. save to album (add to queue to be printed when full—12/24/36 photos)
    e. image adjust
        i. rotate L (and save as rotated)
        ii. rotate R (and save as rotated)
    f. go to settings
2. settings
    a. show image info (during slideshow)
        i. on/off
    b. show current date/time
        i. on/off c. show matte/frame around image
   i. on/off
      1. select from pre-defined styles
         a. other styles added from server
d. slideshow settings
   i. on/off
      1. speed (slow/med/fast or up/down range)
      2. slide portrait images across landscape oriented device
   ii. transition effects
      1. on/off
         a. select from pre-made transitions
            i. slide/filmstrip (simplest default)
            ii. special effect (fade, blend, wipe, etc)—randomized
               1. other effects routines added from server
            iii. "Ken Burns" (pan±zoom)
               1. on/off
e. audio
   i. on/off
      1. play sound/voice (recorded) clips attached to images
f. hardware settings
   i. brightness
      1. up/down range
   ii. wake/sleep
      1. auto-sense (light, motion/proximity, time)
      2. always on
   iii. show frame address±other (network) settings
   iv. new content notification
      1. on/off
         a. use LED/audio notification, user touches frame, view menu opens
   v. "help"—to request assistance with using frame
      1. ask user to call 800 number, or have them called by service provider
      2. give user a URL to use on their PC (direct link to help ticket)
      3. initiate an "audio chat" session with a help center Referring to FIG. 6, in a preferred embodiment, the CPU 90 operating as generally described above effects a UI optimized for devices configured in the manner of CPDs 20', 22' (although, that UI can be gainfully employed on other devices 12'-18', as well) by displaying small groupings (or subsets) of user-selectable function-selection icons 120a, 120b in a carousel-like arrangement. Displayed with those small groupings are one or two icons 122a, 122b used to index through the carousel ("menu-index icons"). Those small groupings preferably constitute 2-5 function-selection icons and, still more preferably 2-3 such icons and, still more preferably, only two such icons—as indicated by icons 120a, 120b in the drawing. In contrast, the set of user-selectable function-selection icons from which the subsets are selected is large, e.g., compared to the available "real estate" on the display 102 on which those icons are displayed. (Put another way, the display 102 of the illustated embodiment is too small to practically list any sizeable fraction of the icons, e.g., while still presenting images or other graphics to the node user).

In the illustrated embodiment, the set of user-selectable function-selection icons from which the subsets are selected is ten or larger and, more particularly, 15 or larger and, still more particularly, twenty or larger, and yet still more particularly is approximately equal in number to the invocable functions listed above and, yets, still more particularly, is equal to the number of "leaves"—as opposed to "branches"—in the hierarchical listing of invocable functions above. (In other embodiments, function-selection icons may be provided corresponding to one or more of such branches, as well). In contrast, the display 102 of the illustrated embodiment is approximately 1"-10" in width and 1"-10" in height and, more preferably, 1"-7" in width and 1"-5" in height and, still more preferably, about 4"-7" in width and about 4"-7" in height. Moreover, the real estate on such display 102 in which the icons are displayed may range from 5%-100% of the display 102 depending on its size. For example, in a display 102 that is 6"×4" or 5"×7" inches, that real estate may comprise 20% of the display (thereby, leaving more of the display available for images), while in a display 102 that is 10"×8", that real estate may comprise 10% of the display.

As above, user selection of selected function-selection icons results in invocation of the respective associated function, while user selection of other such function-selection icons results in a display which (i) presents options necessary to further specify function selection, and which may differ in format (for example, not including display of a carousel-like arrangement of user-selectable function-selection icons). Conversely, user selection of menu-index icons (which, themselves, may be textual or graphical) results in presentation of the subsequent or preceding small grouping of function-selection icons in the carousel.

In still other embodiments of the invention, the CPU 90 may implement a menu utilizing a combination of hierarchical and carousel-like graphical formats/structures. In yet still other embodiments, the CPU 90 may implement still other menu structures.

Regardless, the CPU 90 can implement a UI that presents additional textual and/or graphical information on the display 102, e.g., for user viewing and/or selection. This can include captions 124 containing, for example, image information (e.g., time/date of image acquisition, sender identification, and so forth, as discussed above). It can also include, for example, user-selectable navigational icons 126a, 126b that permit the user to "step through" a sequence of images (or other content) of the type transmitted by server 24a' to device 20'.

Figure 6:
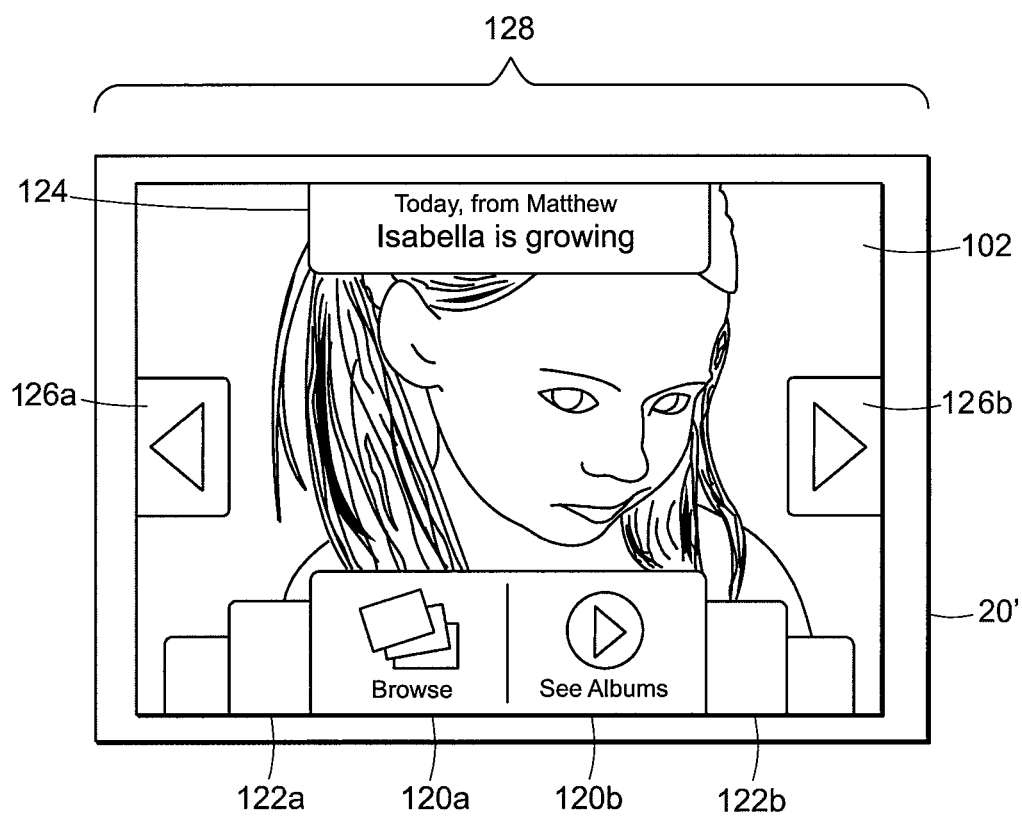
FIG. 6 depicts a user interface according to the invention of the type utilized on the content presentation devices of FIGS. 4-5.

For convenience, a UI effected by CPU 90 on display 102 is referred to as a "screen." In FIG. 6, that screen is denoted by reference 128 and is shown superimposed over an image—here, of a small girl—of the type transmitted by server 24a' to the device 20'.

Figure 7:
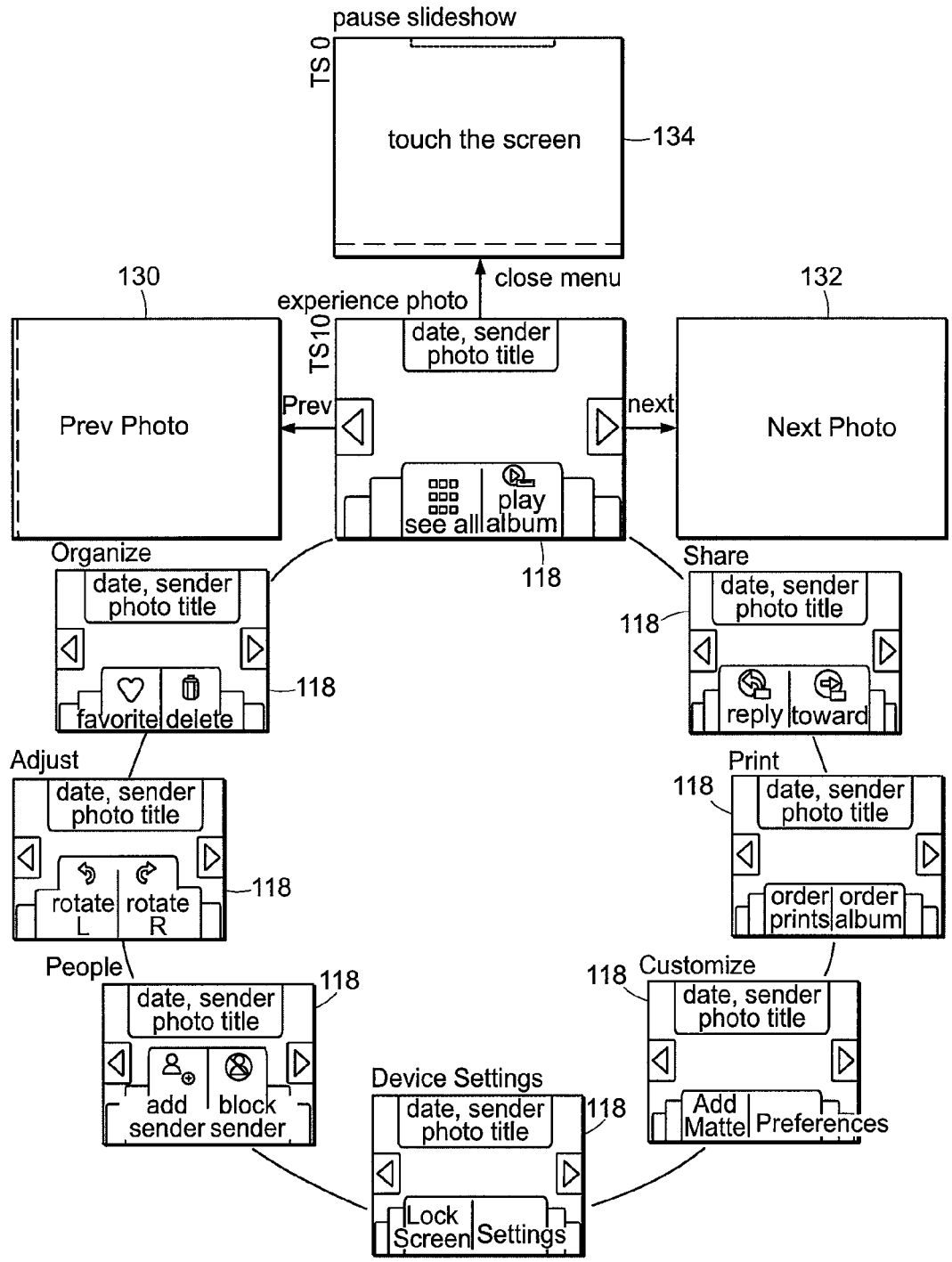
FIGS. 7-8 are a "wireframe" depicting screens of a user interface according to the invention of the type utilized on the content presentation devices of FIGS. 4-5.

FIG. 7 is a "wireframe" depicting, inter alia, a preferred relationship between screens 118 effected by CPU 90 in response to user selection of menu-index icons in an embodiment that employs a carousel-like menu structure. As evident in the drawing, repeated selection of one of the icons 122a (or the other, 122b) results in traversal the set of small groupings of function-selection icons that comprise the carousel. Of course, it will be appreciated that, while eight screens 118 are shown in the drawing, other embodiment may employ a greater or lesser number thereof.

FIG. 7 also depicts the effect of user selection of navigational icons 126a, 126b. Particularly, screen 130 depicts display of a prior image in a sequence of images (or other content) of the type transmitted by server 24a' to device 20'. Conversely, screen 132 depicts display of a successive image in that sequence upon user-selection of navigational icon 126b. Although no icons are shown on screens 130, 132, those of the type shown in screen(s) 118 can be effected by CPU 90 on screens 130, 132, as well (e.g., in response to a user touch).

FIG. 7 depicts, in addition, the effect of user selection of caption 124 in a screen 118. Particularly, such selection effects indefinite display (until further action by the user) of any sequence of images (or other content) currently being displayed, preferably, without any icons of the type present in screen(s) 118.

Figure 8:
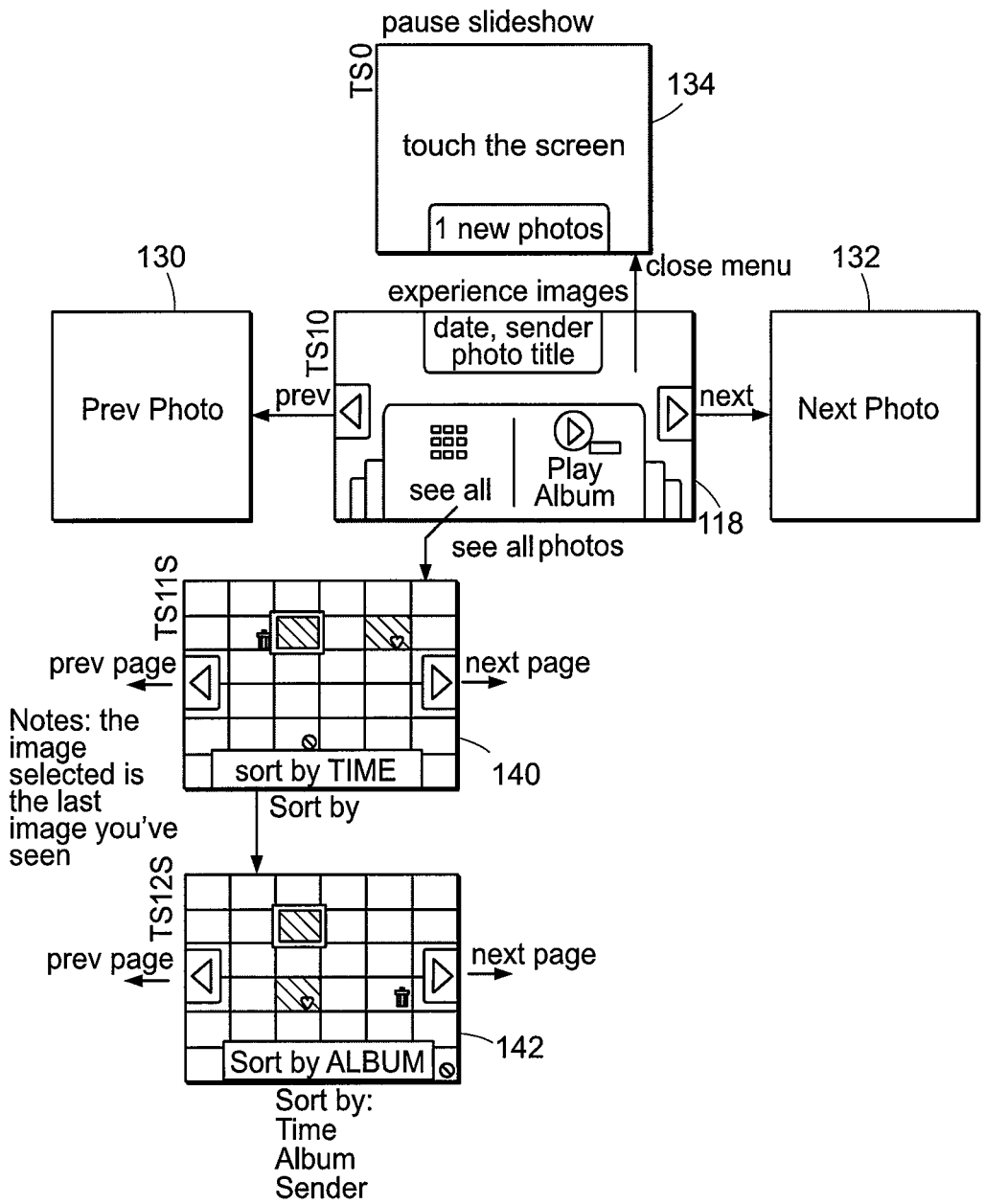

FIG. 8 is a wireframe depicting, inter alia, screens 140, 142 effected by CPU 90 in response to user selection of certain function-selection icons on screen 118—and, particularly, upon selection of one that results in a display, here, screen 140 (and, subsequently, screen 142), which (i) presents options necessary to further specify function selection, and which, here, differs in format from screen 118 (e.g., insofar as screen 140 does not include a carousel-like arrangement of user-selectable function-selection icons).

For sake of clarity, no actual images (e.g., of a small girl, or otherwise), are shown in the screens depicted in FIGS. 7-8.

FIGS. 10-30 are wireframes depicting a more complete user interface effected by CPU 90 on display 102 of a CPD 20' (and 22') in a system according to the invention. As will be evident to those skilled in the art, FIGS. 10-30 depict additional screens of the type shown in FIGS. 7-8 (and, indeed, include replicas of the screens of FIGS. 7-8 for completeness) and described above.

Content Sharing Model

Figure 9:
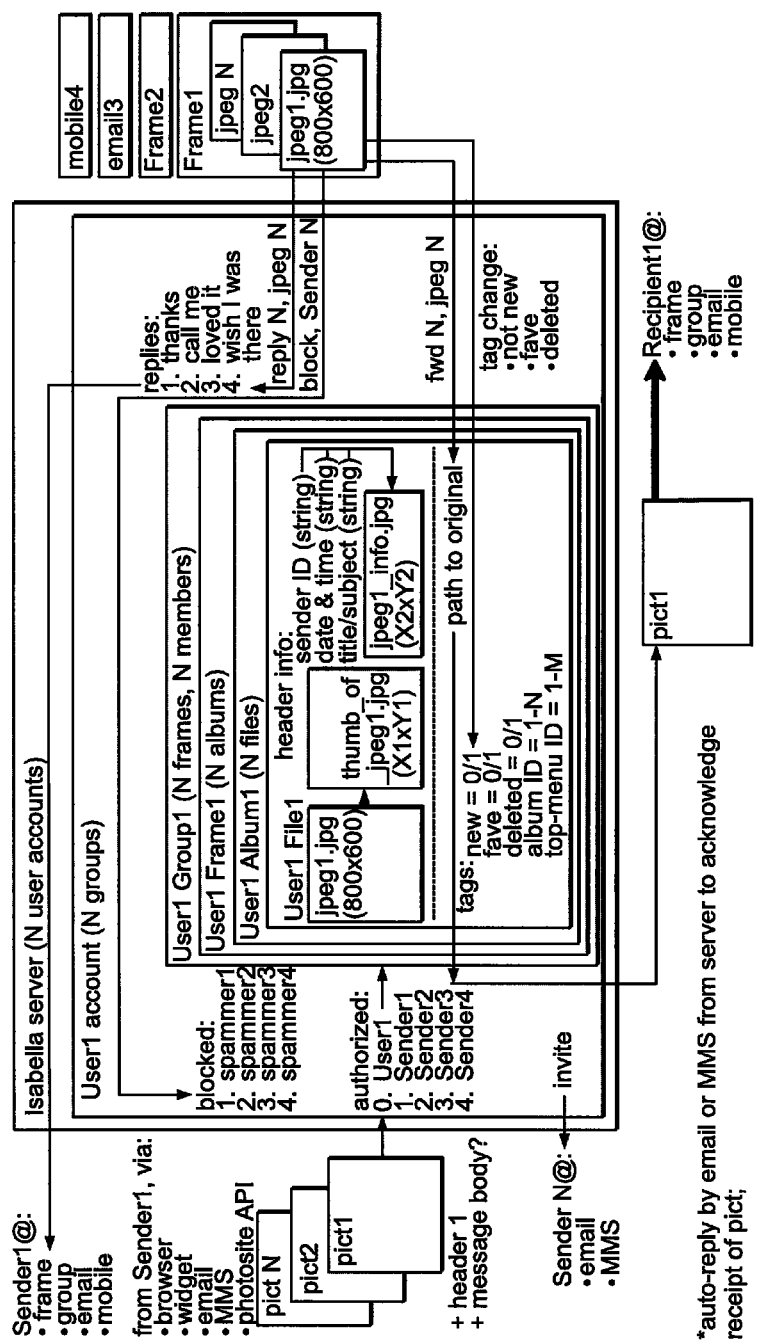
FIG. 9 depicts a model for sharing multimedia content (here, images) according to one practice of the invention.
Figure 10:
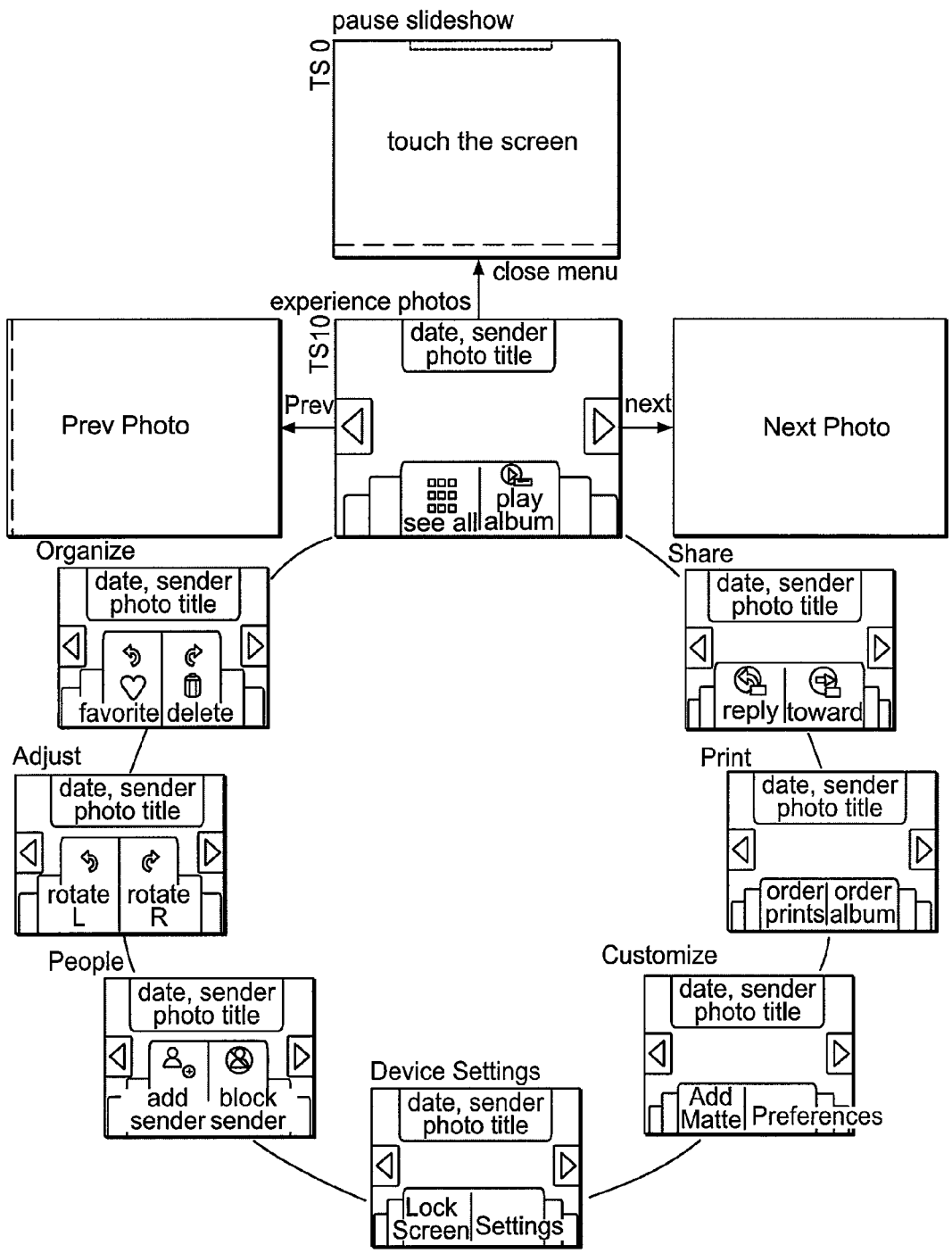
Figure 11:
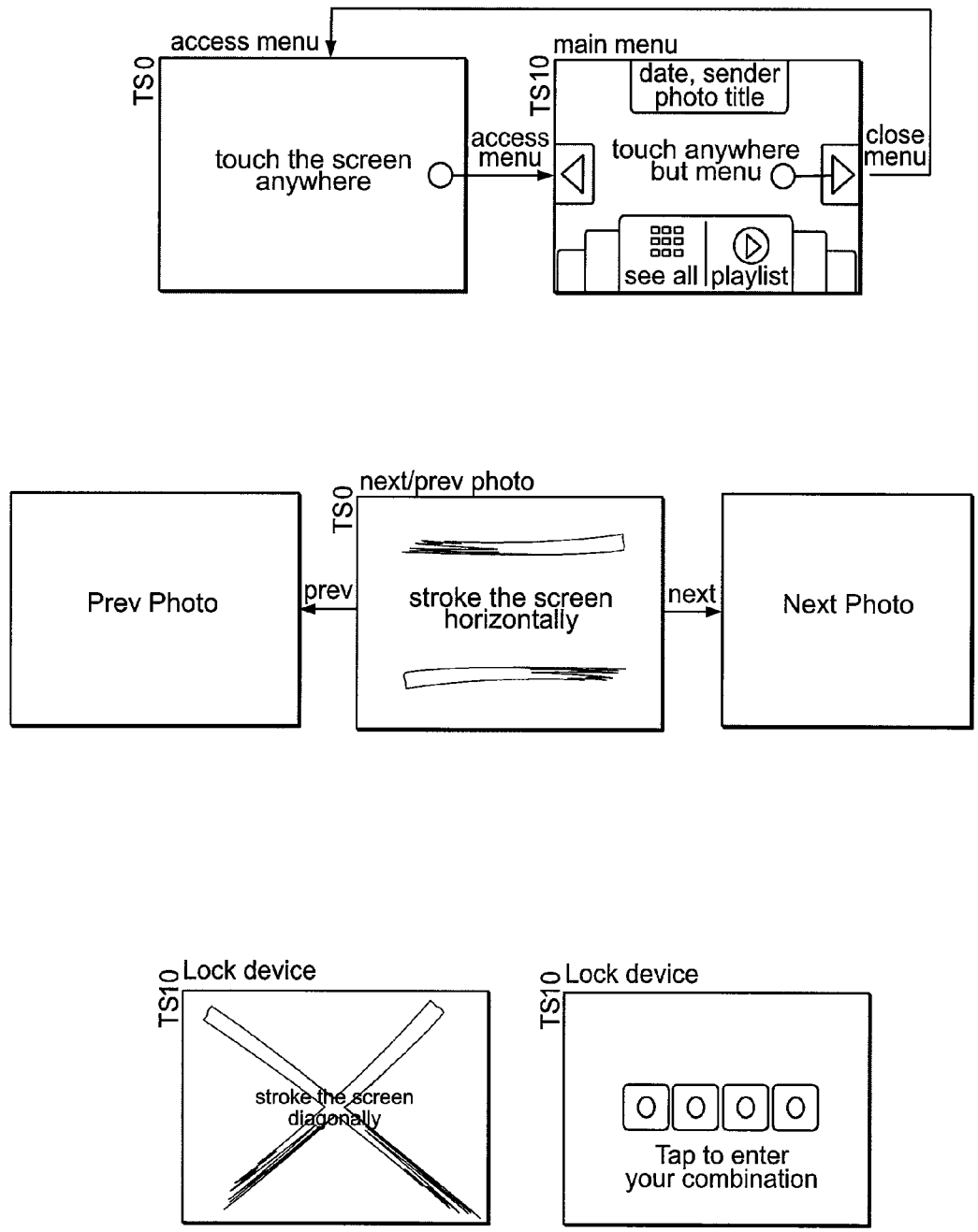
Figure 12:
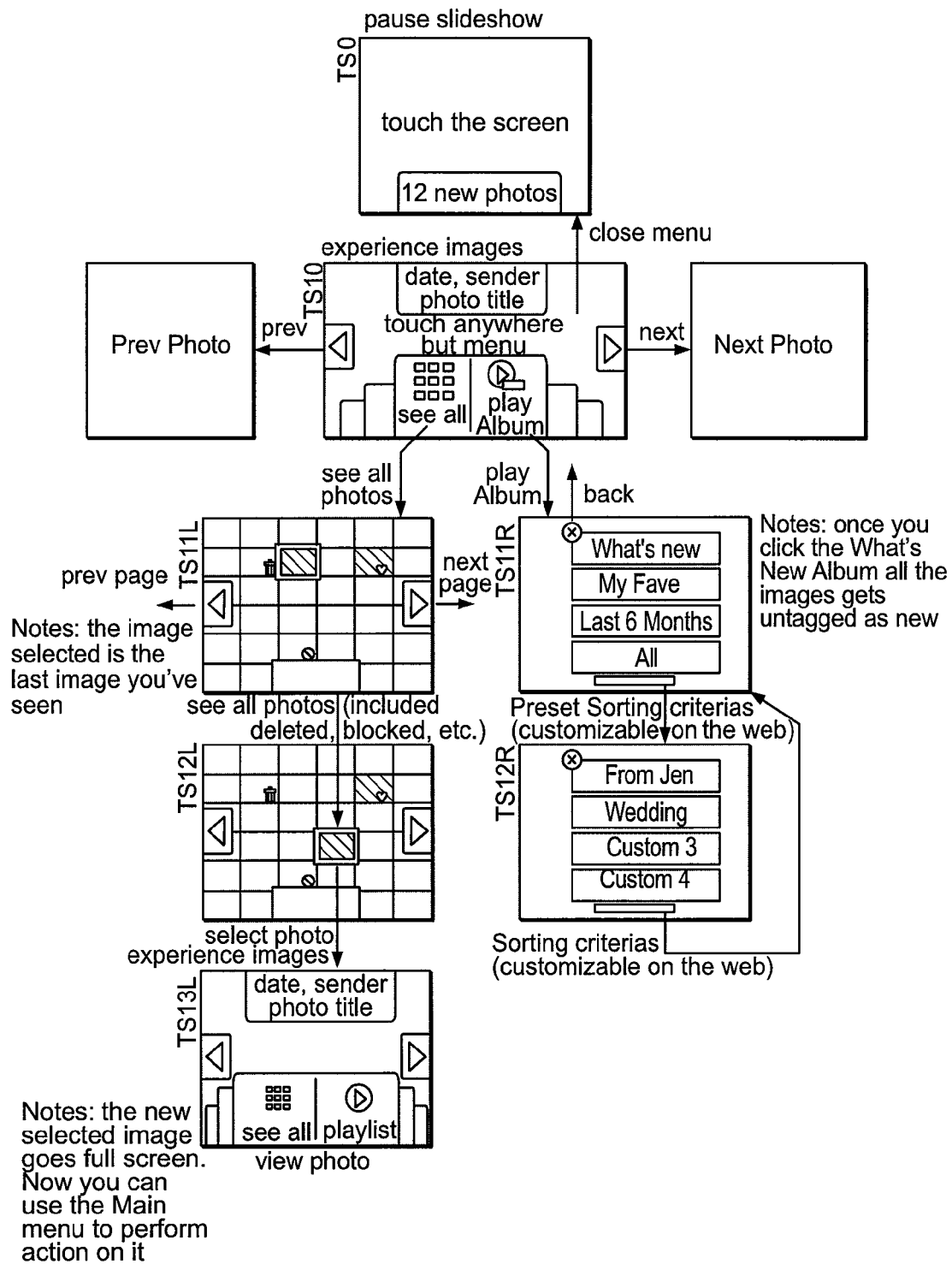
Figure 13:
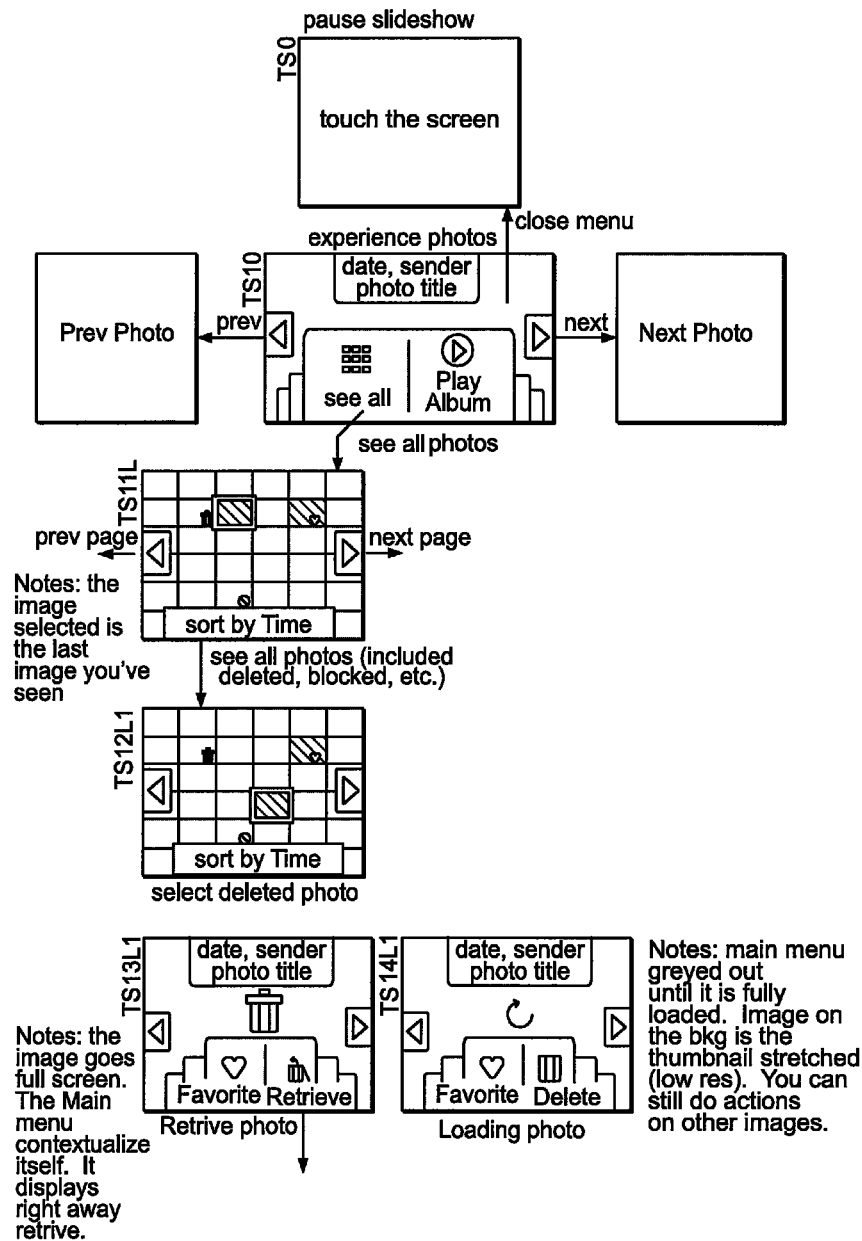
Figure 14:
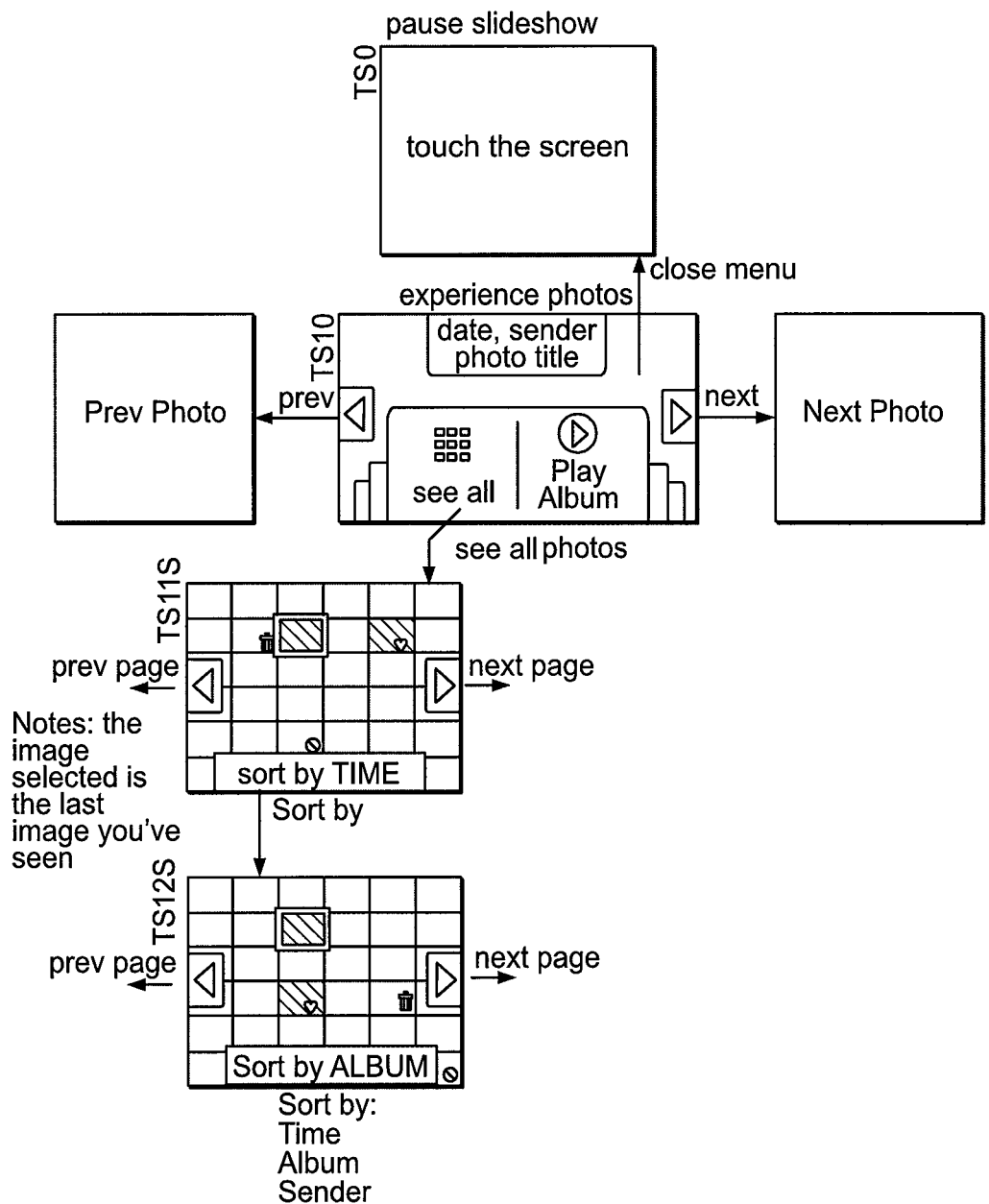
Figure 15:
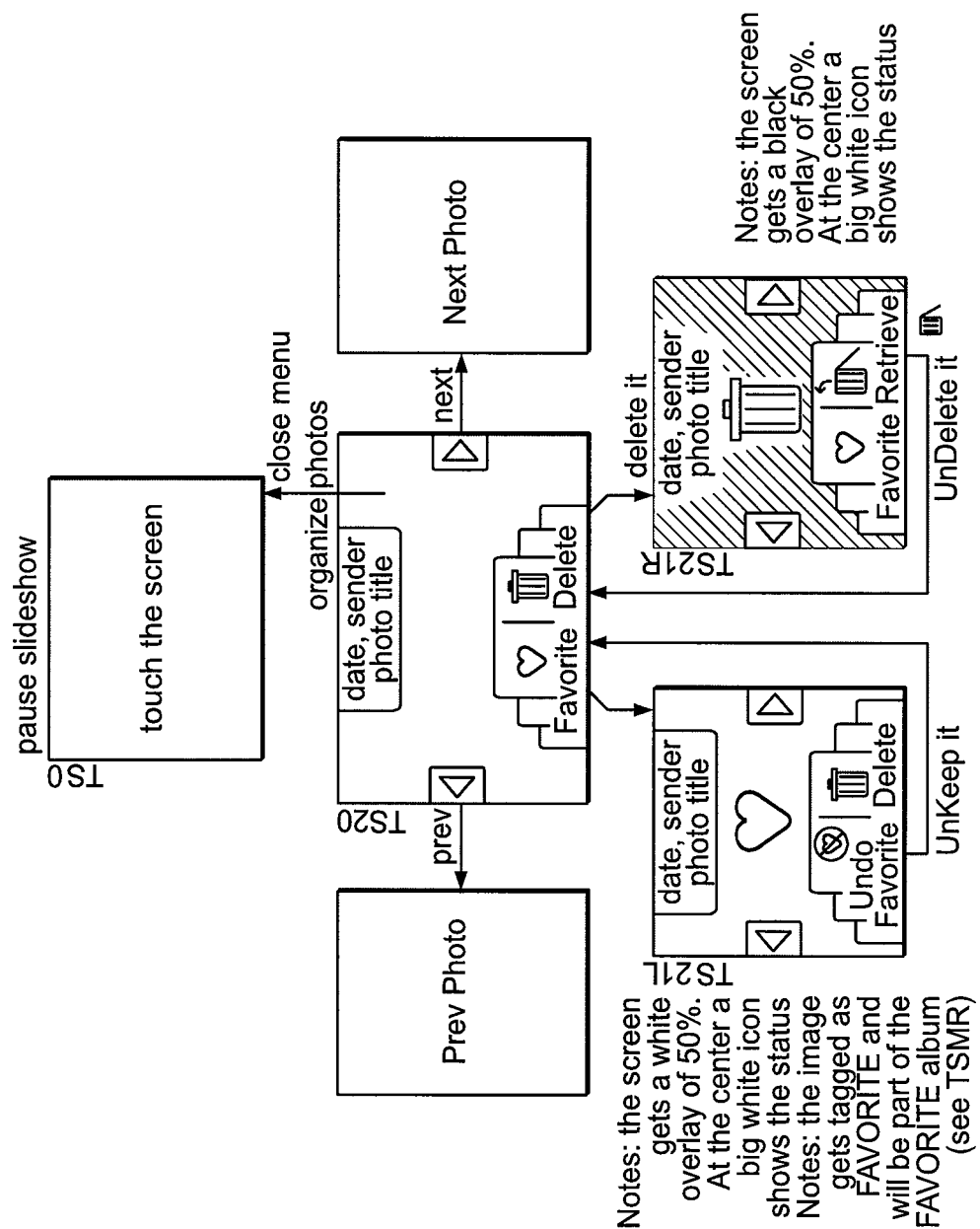
Figure 16:
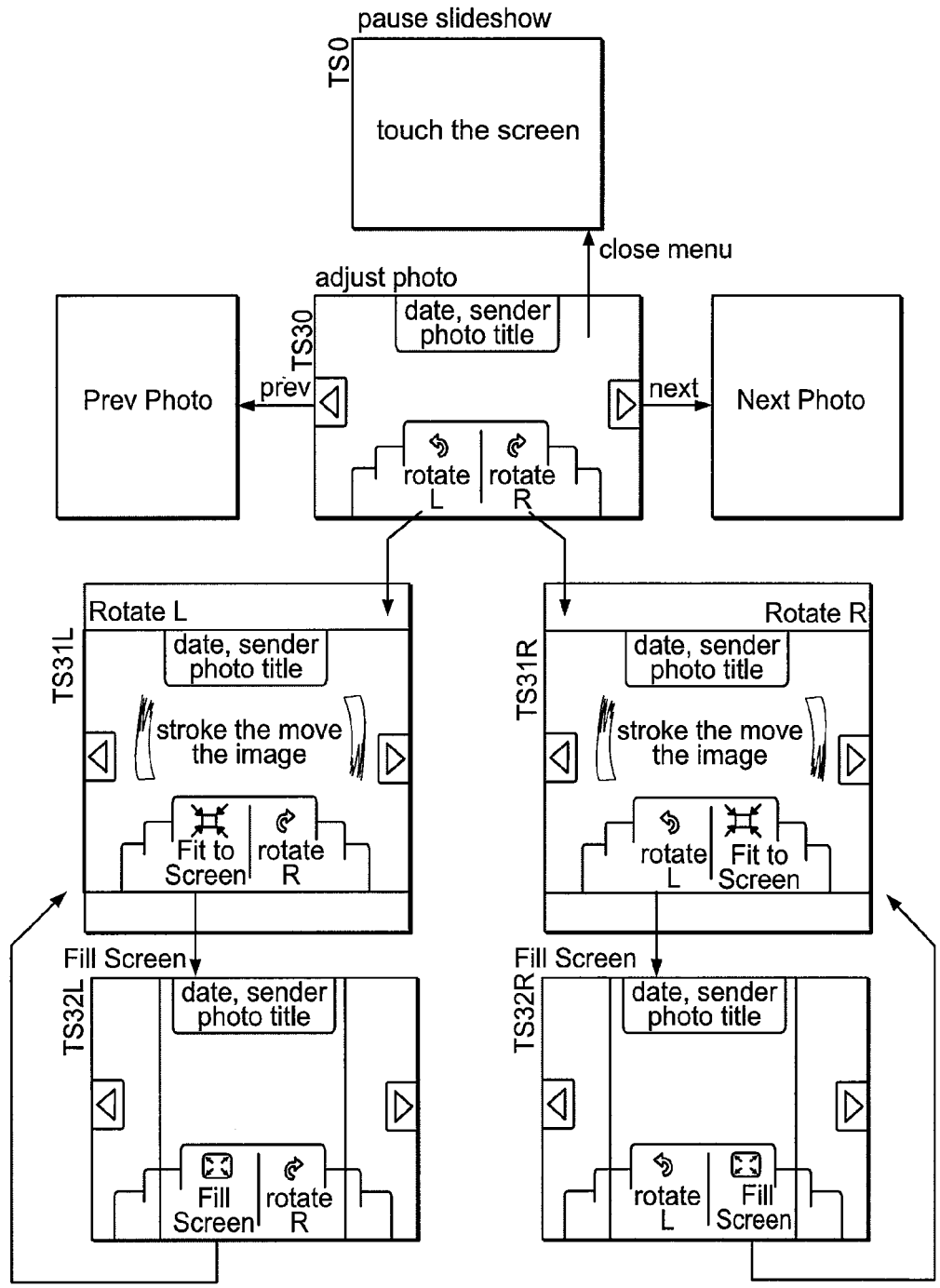
Figure 17:
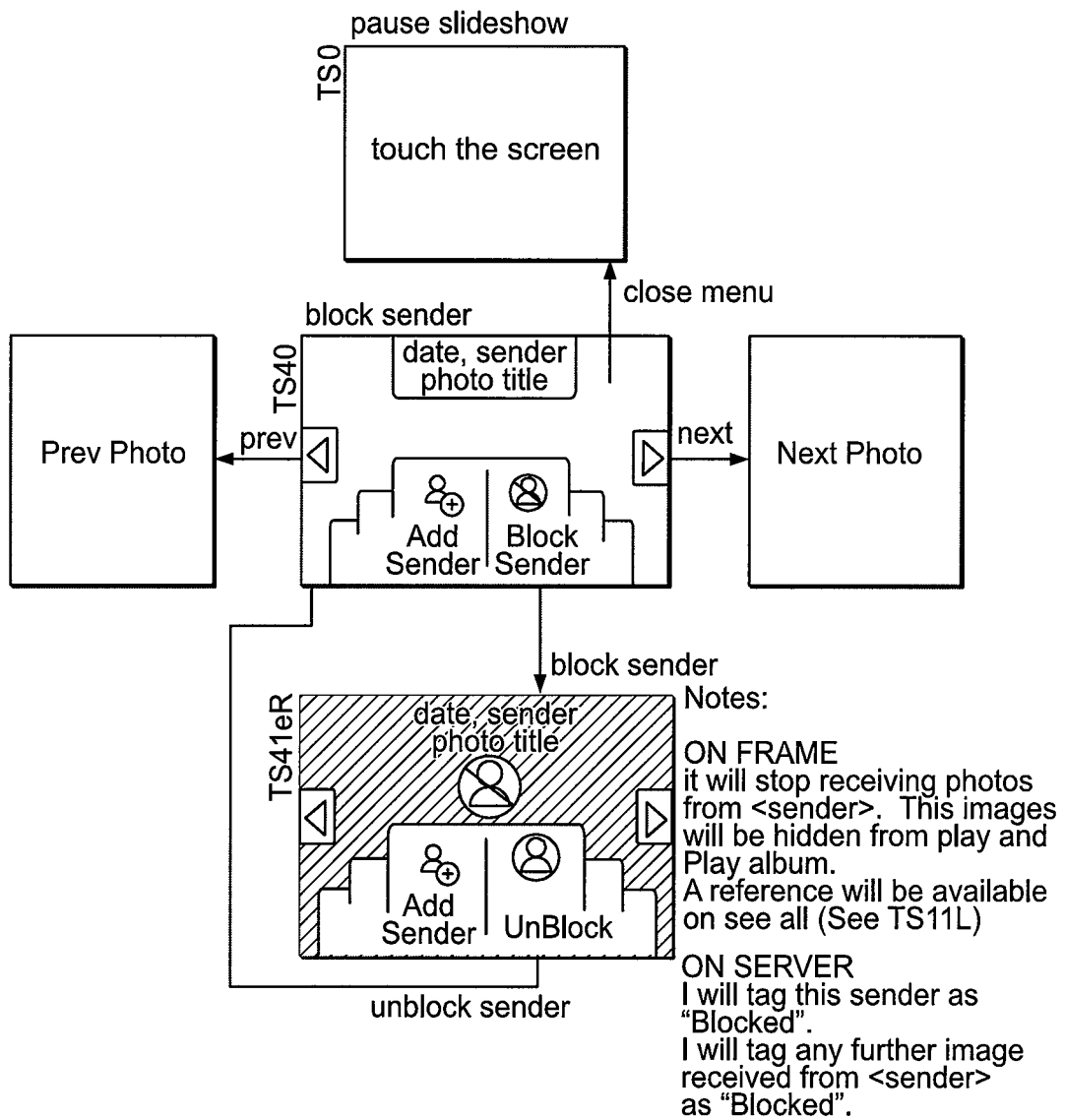
Figure 19:
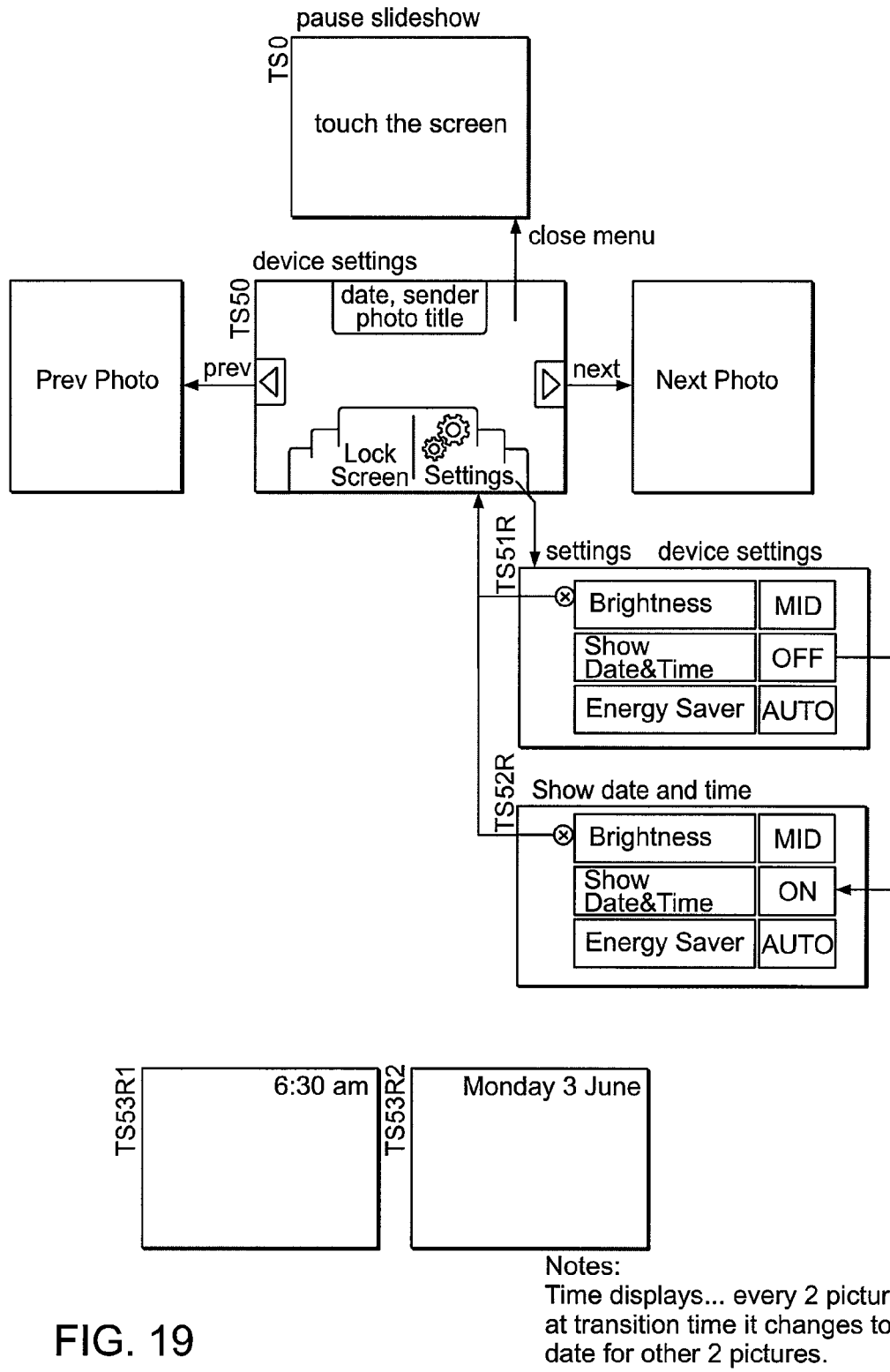
Figure 20:
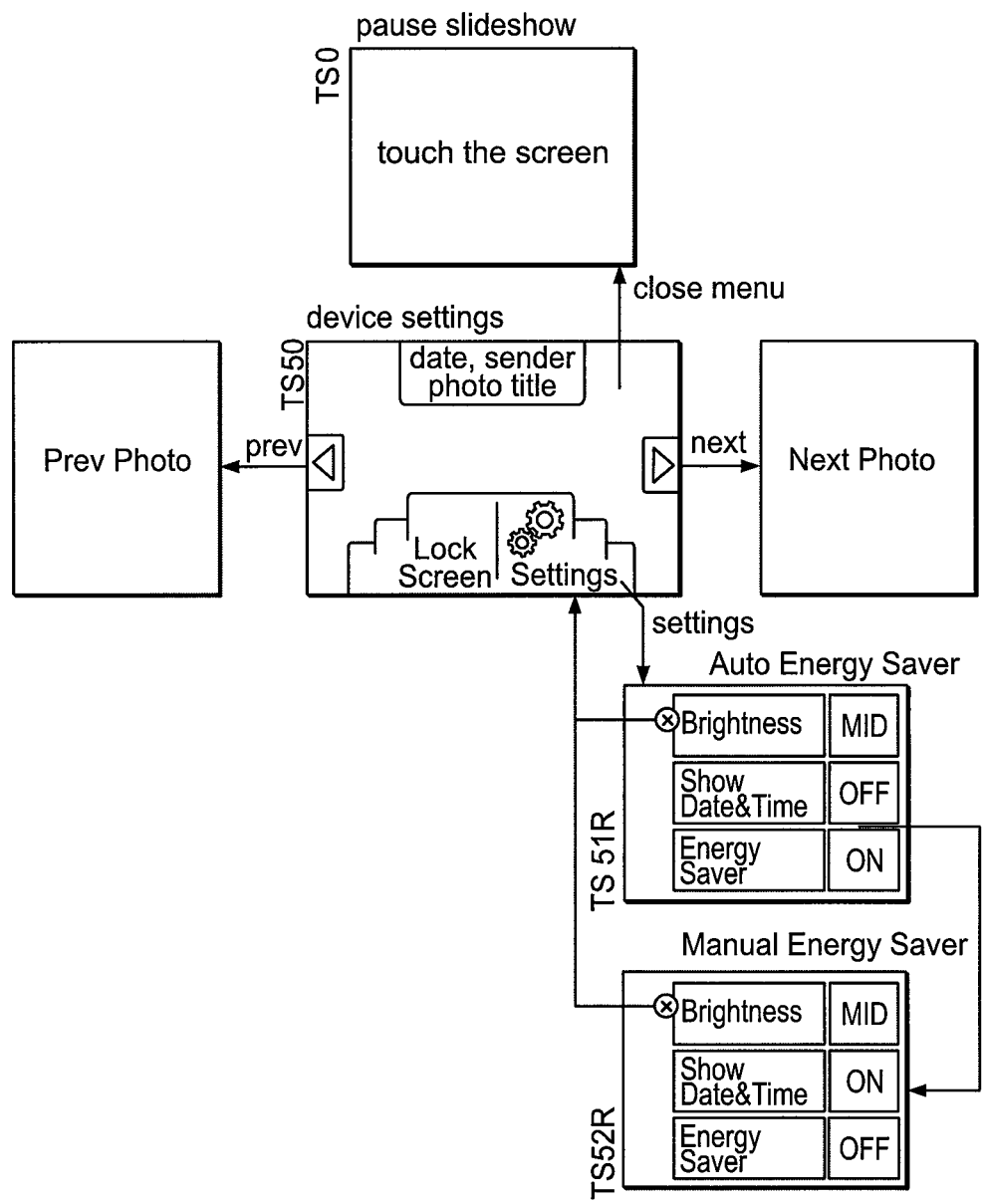
Figure 21:
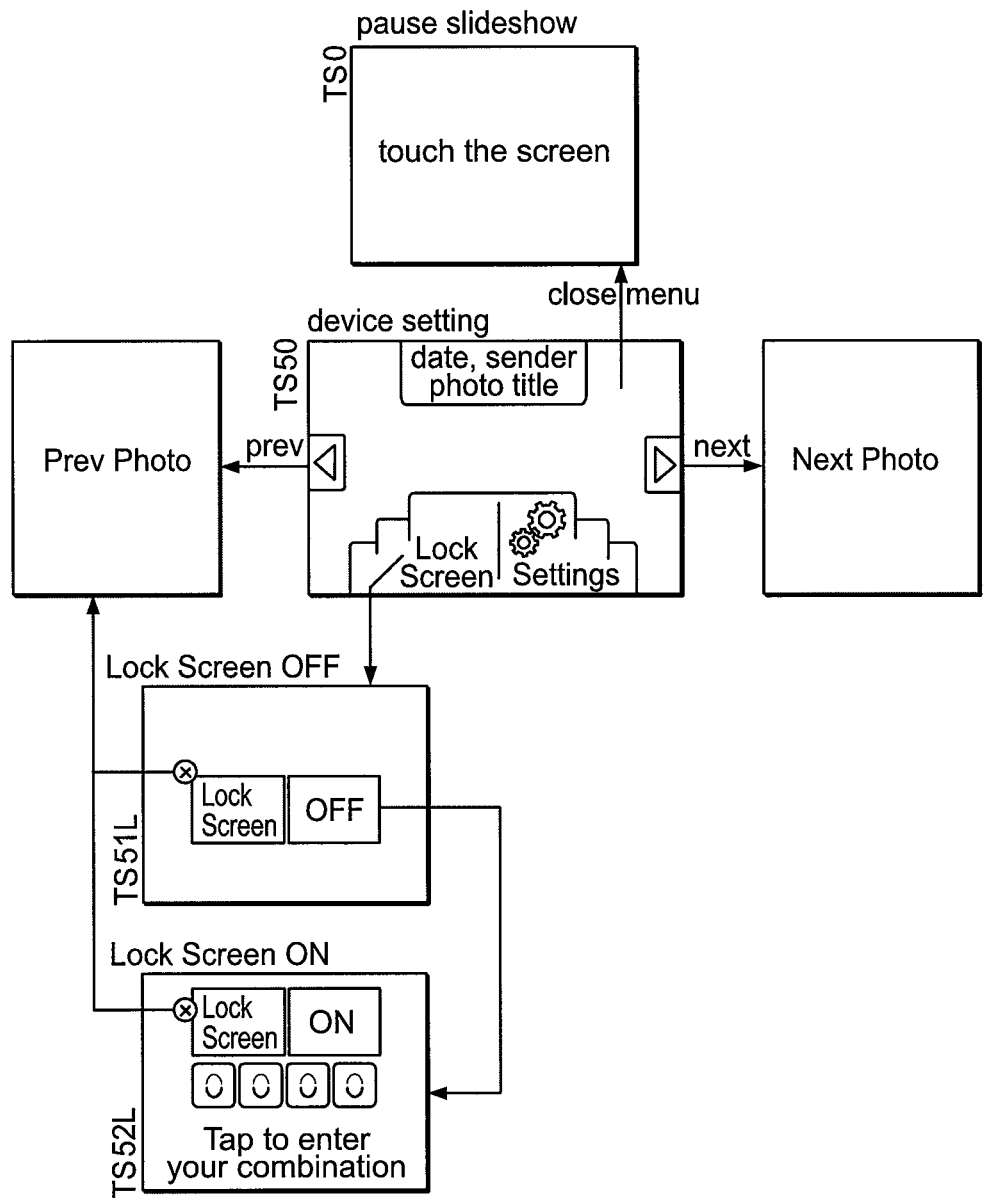
Figure 22:
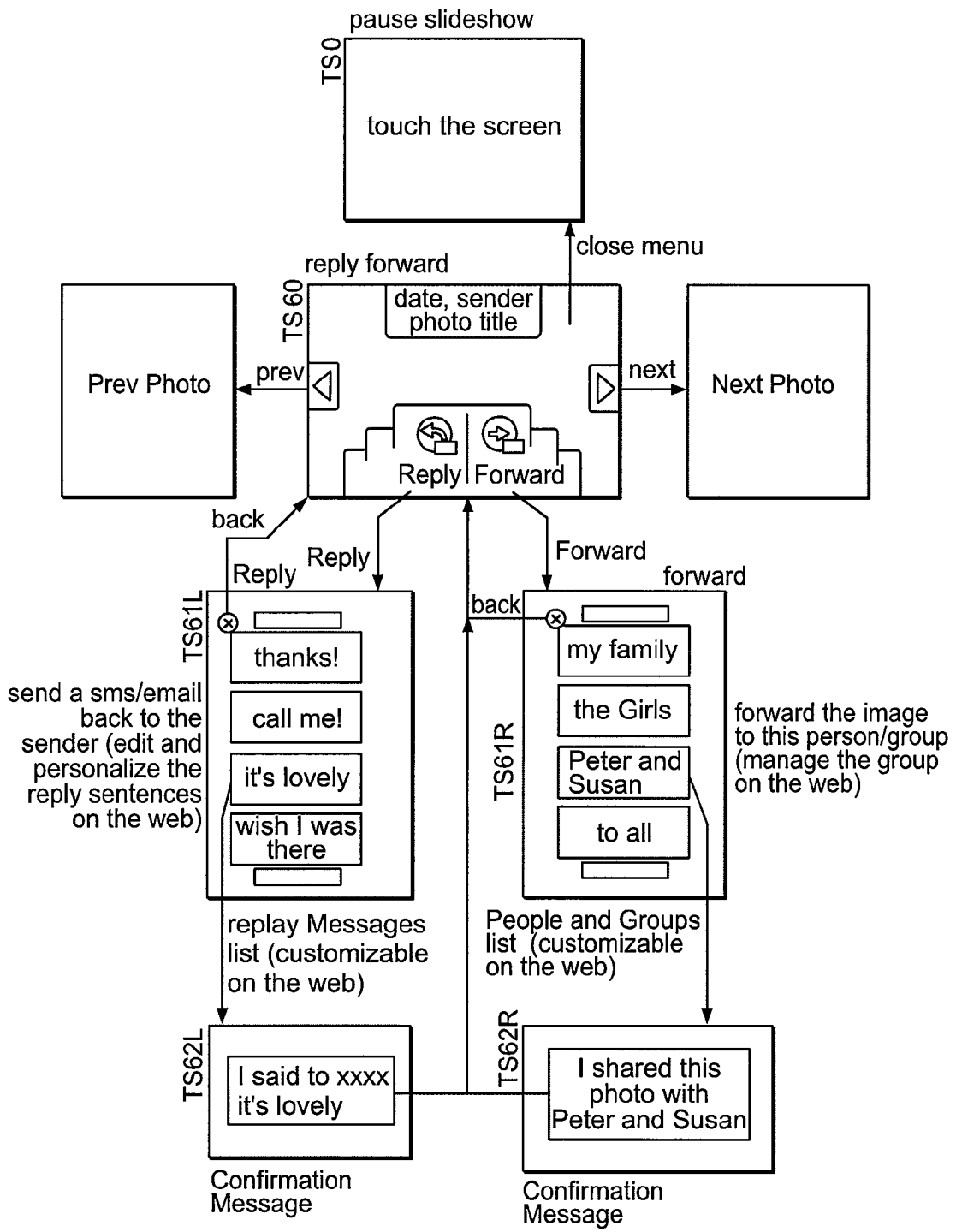
Figure 23:
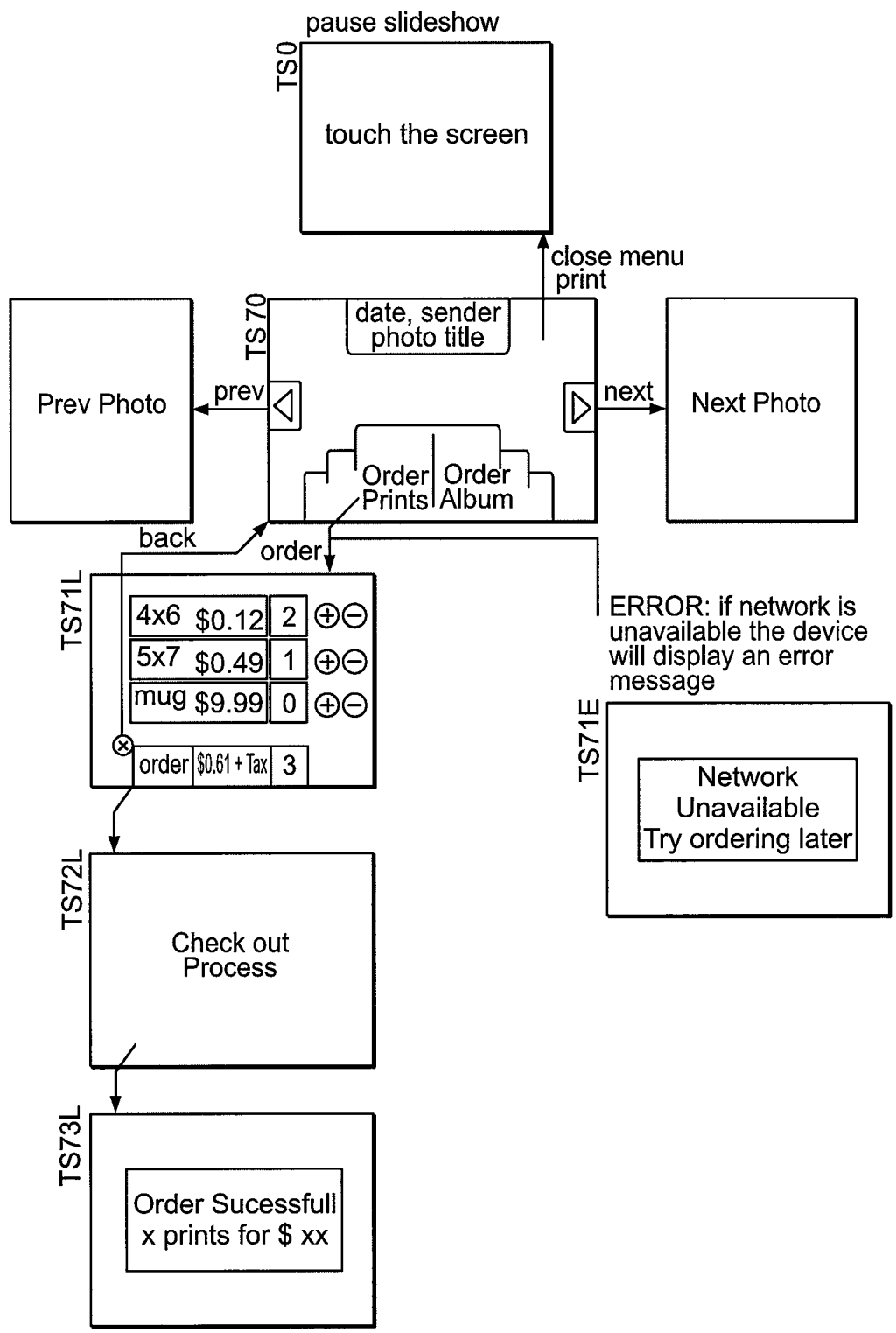
Figure 24:
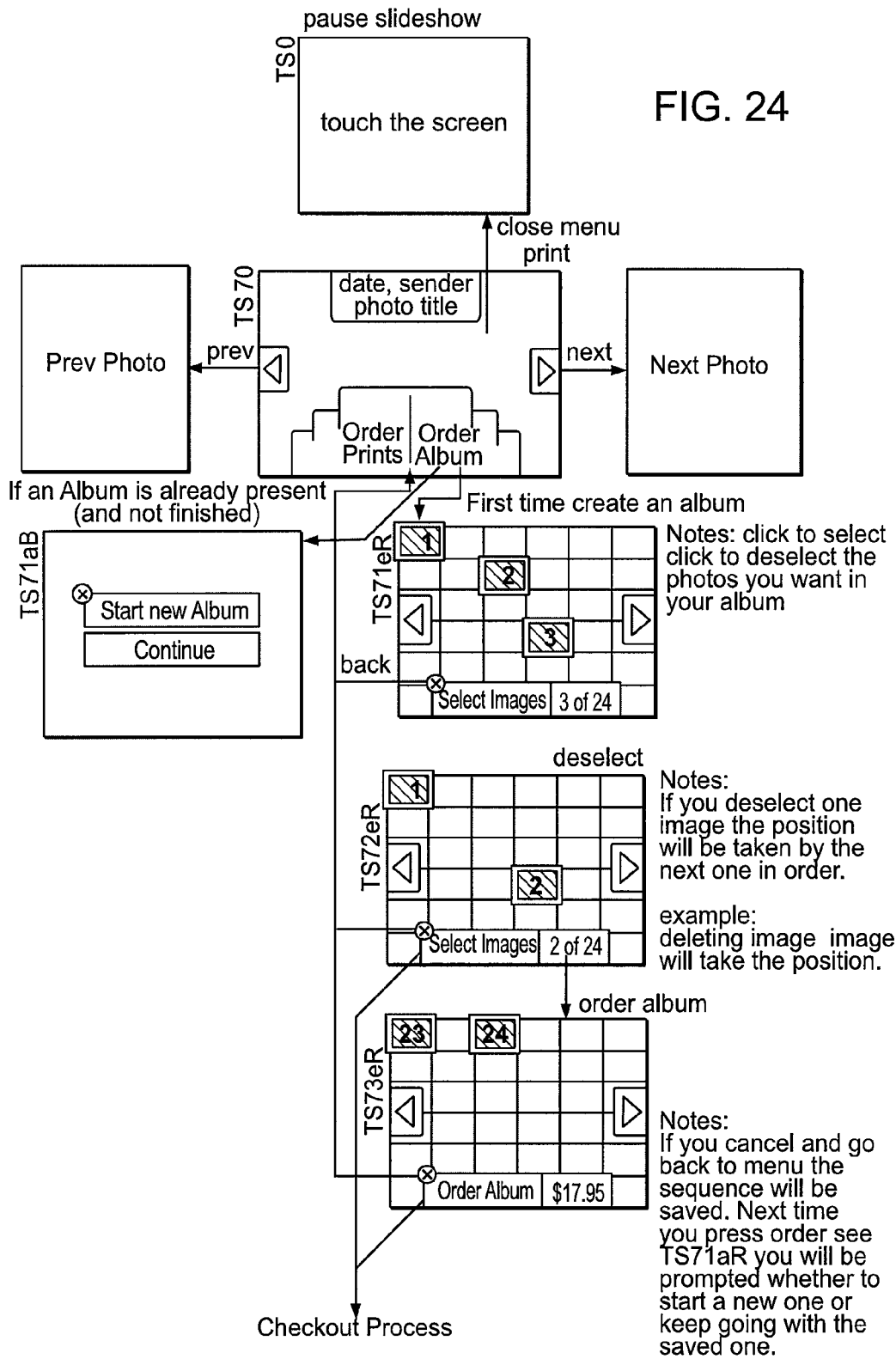
Figure 25:
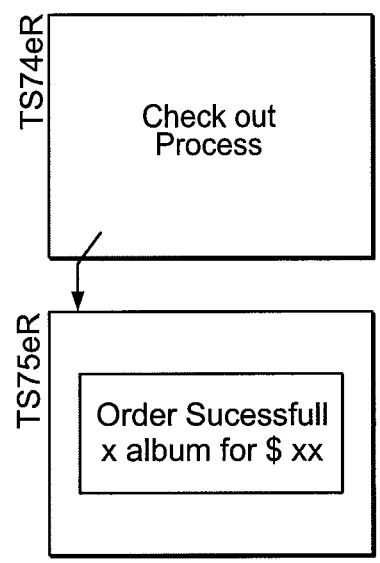
Figure 26:
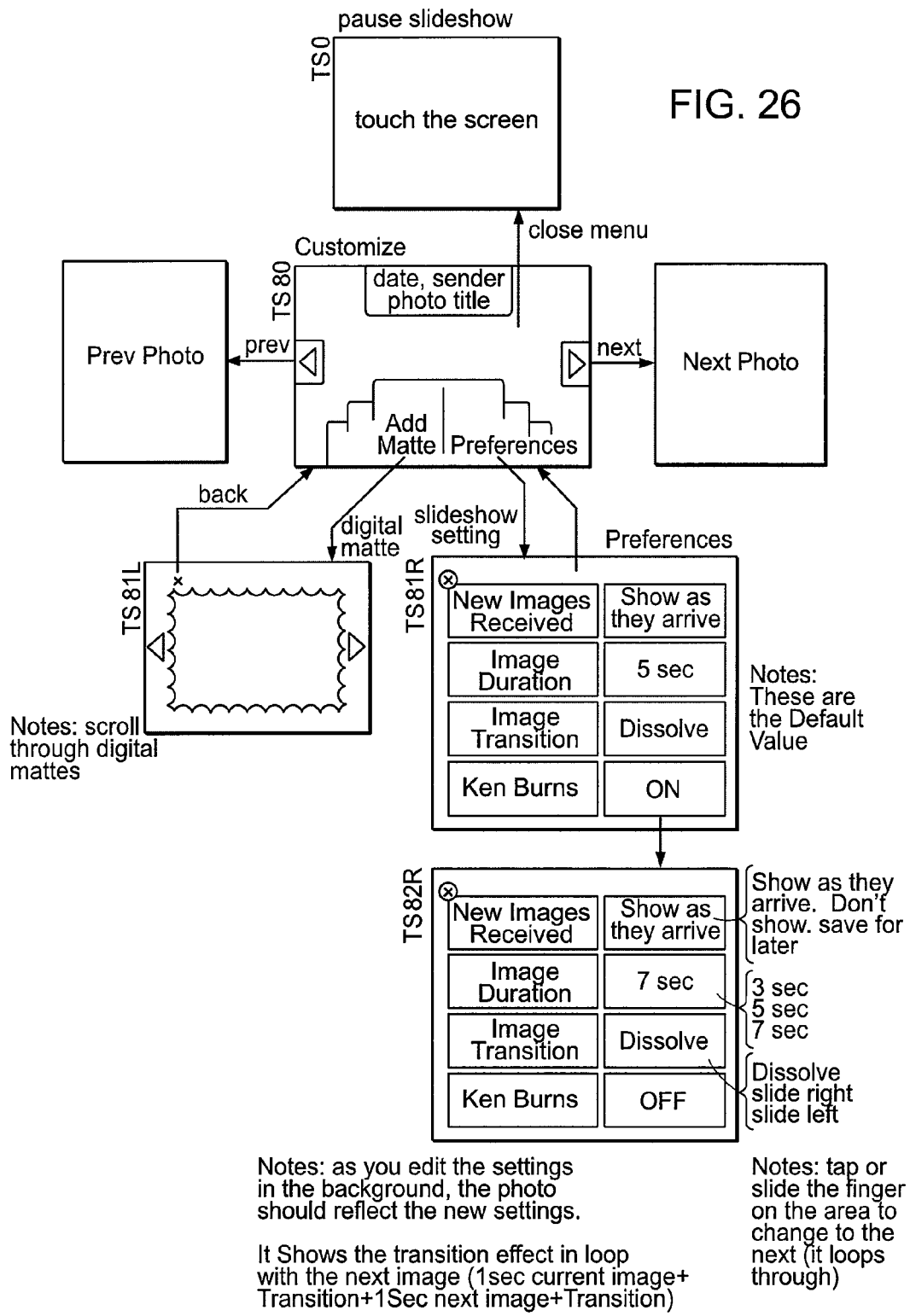
Figure 27:
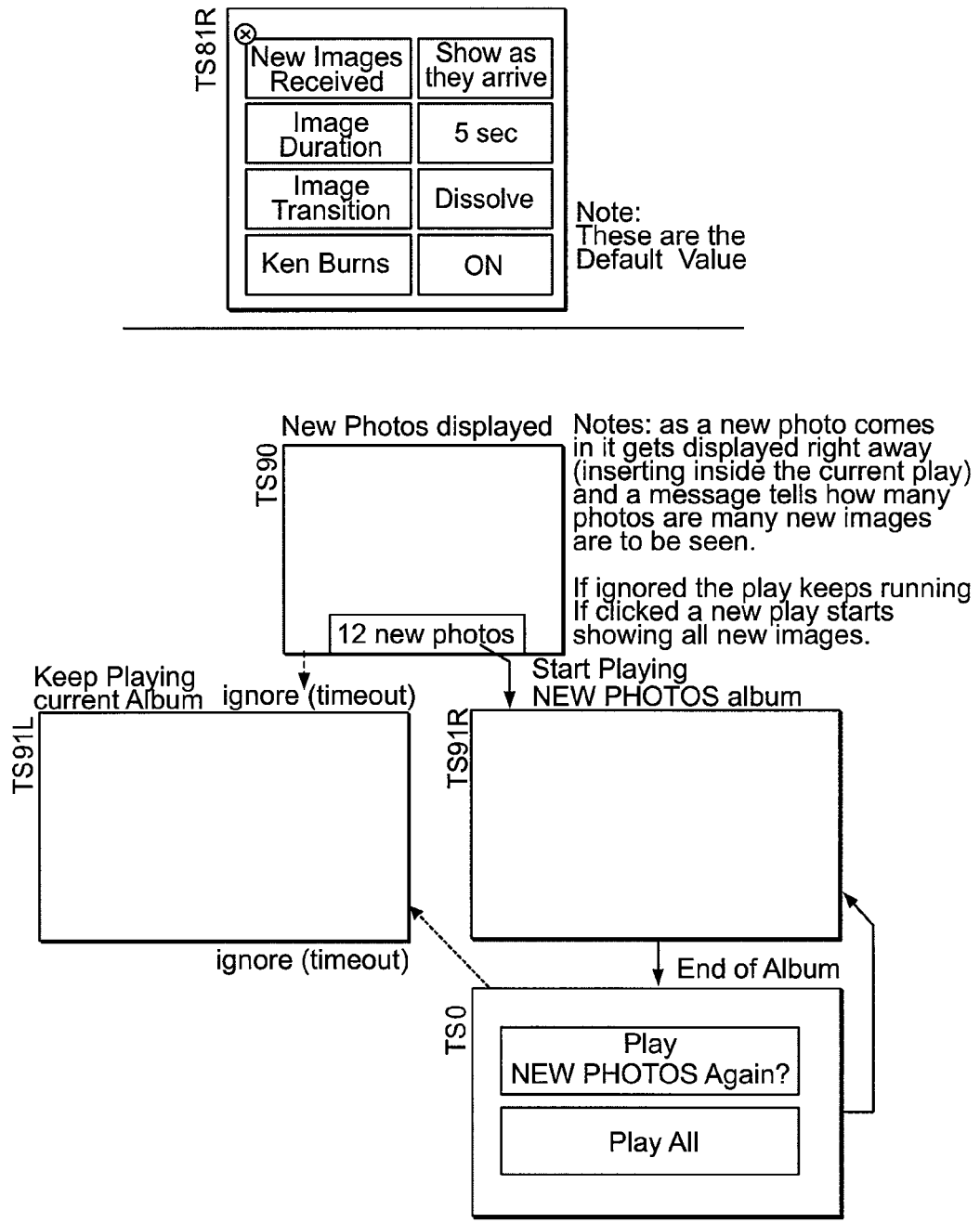
Figure 28:
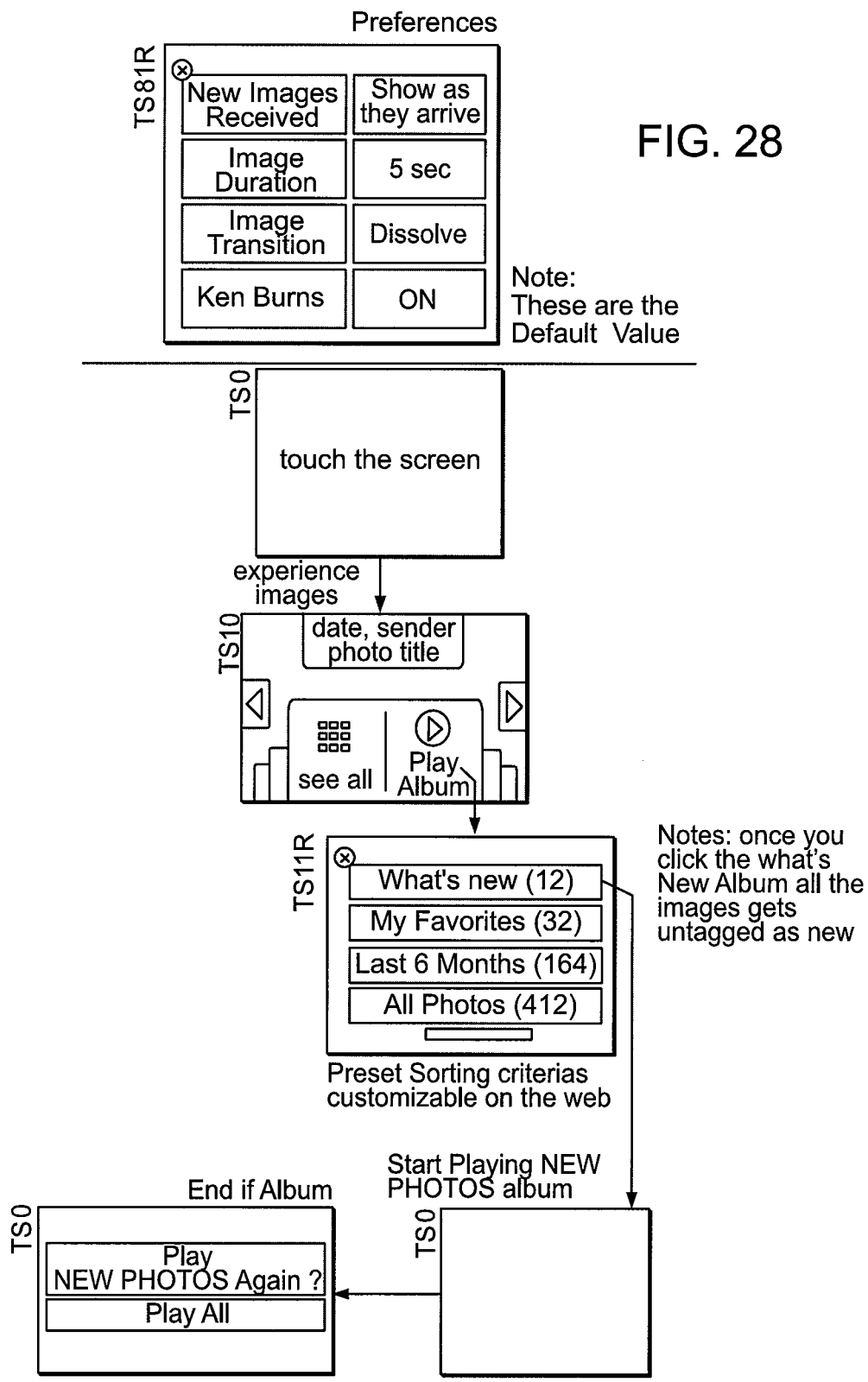
Figure 29:
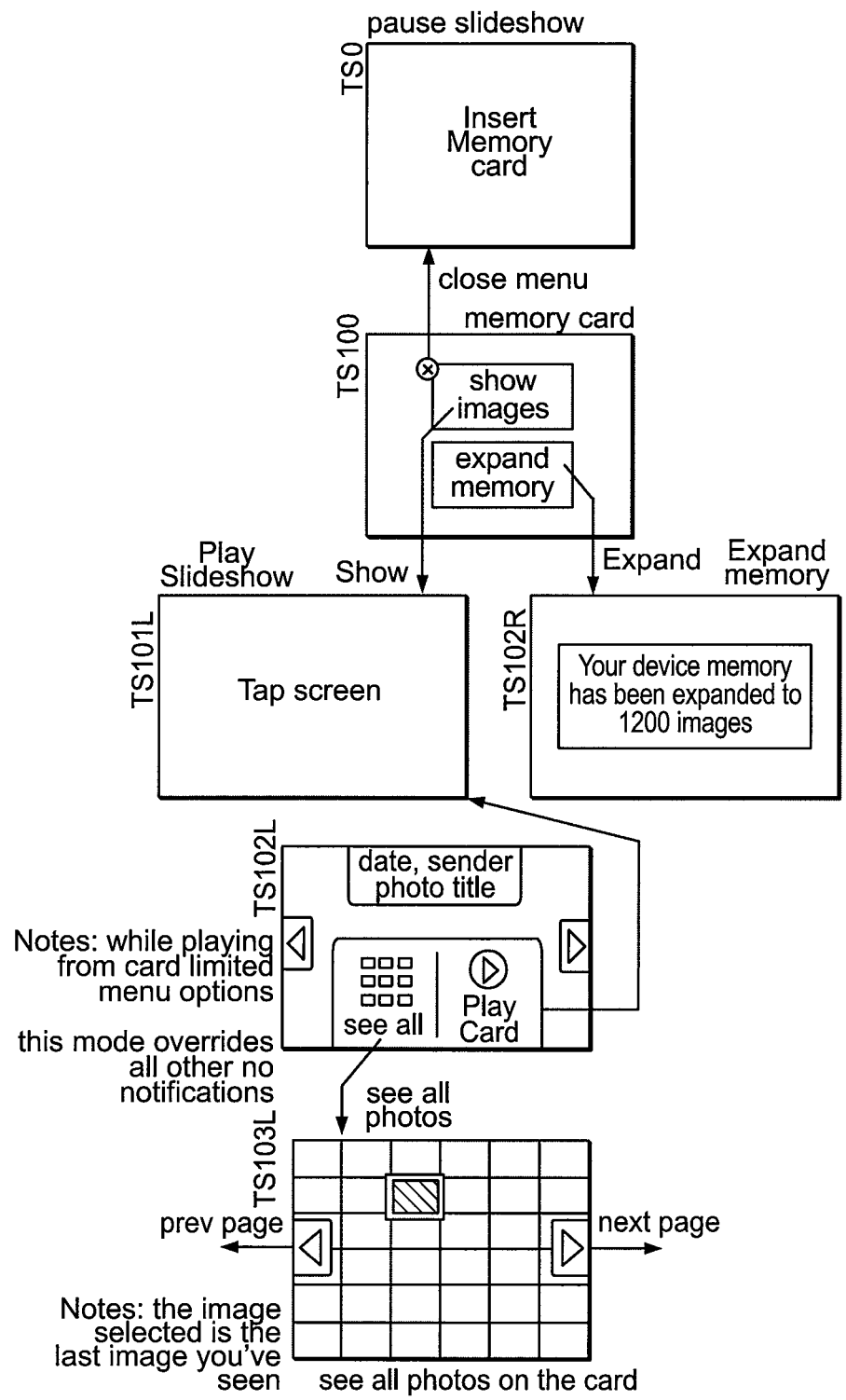
Figure 30:
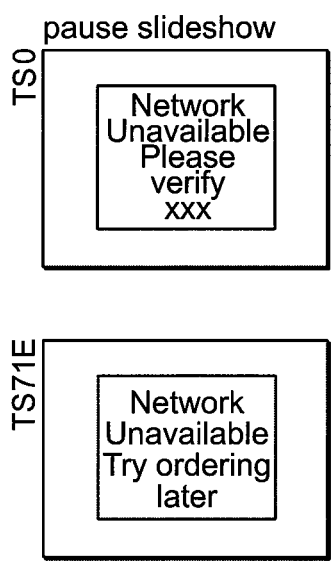

FIG. 9 depicts a model for sharing multimedia content (here, images) according to one practice of the invention. As above the model is merely an example of one which can be used in practice of the invention and is provided for illustrative, non-limiting purposes. The drawing is a combined (i) block diagram and (ii) flow chart, illustrating:

(i) organization of server store, including representation of a user account, organization of other nodes into a community a.k.a. 'group', node synch (between server and CPD a.k.a. 'frame'), organization of an 'album' of content, and including representation of an image and corresponding image information (as also shown in FIG. 2), a.k.a. 'file'; and (ii) input to server (e.g. from Sender1), content management (server store), distribution to nodes and/or groups of nodes (Frame1, Frame2, email3, mobile4), and examples of feedback (e.g. reply, block, undelete, forward, tag) to other nodes (e.g. Sender1 and Recipient1) via the server.

Described above are systems, devices and methods meeting the aforementioned objects, among others. It will be appreciated that the embodiments described and shown herein are merely examples of the invention and that other embodiments incorporating changes thereto may fall within the scope thereof. Thus, by way of non-limiting example, the permissions described above as attributable to nodes may, instead or in addition, be attributable to users of those nodes.

In view thereof, what we claim is:

1. A multimedia content sharing system, comprising
   A. a shared content server storing a plurality of items of content, where the stored items of content are any of still, moving images and audio,
   B. a plurality of nodes, each in communication coupling with the shared content server via one or more networks,
   C. the shared content server transmitting, via the one or more networks,
      i. a first set of one or more of the plurality of items of content stored on the server to each node in a first set of said nodes without a request by any user of that node for such item, where the first set comprises one or more of the plurality of nodes, and wherein each node in the first set of said nodes stores the first set of one or more of the plurality of items in a local store associated therewith,
      ii. a second set of one or more of the plurality of items of content stored on the server to each node in a second set of said nodes without a request by any user of that node for such item, where the second set comprises one or more of the plurality of nodes and where the second set of items may overlap the first set of items, where the second set of nodes may overlap the first set of nodes, and wherein each node in the second set of said nodes stores the second set of one or more of the plurality of items in a local store associated therewith,
   D. at least one said node ("first peer node") in at least one of the first and second sets of nodes, (i) presenting any of visually and/or aurally the content of at least one item of content received from the shared content server, (ii) accepting user feedback with respect to that item of content, the user feedback reflecting user input regarding the item of content, and (iii) transmitting that user feedback to the shared content server,
   E. the shared content server transmitting the user feedback to at least one node ("second peer node") that is in the set of nodes to which the first peer node belongs without retransmission of the article of content with respect to which the user feedback was accepted, which second peer node alters a presentation on that node of that item of content as stored on the local store associated therewith based on that user feedback.

2. The system of claim 1, wherein the step of accepting user feedback with respect to the item of content includes one or more of (i) copying the at least one item of content to an album, (ii) rotating the at least one item of content, (iii) requesting that a further node be blocked from presenting the at least one item of content, (iv) requesting that a sender of the at least one item of content be blocked from transmitting one or more items of content.

3. The system of claim 1, wherein the first peer node receives via a cellular modem at least one of the items from the shared content server.

4. The system of claim 1, wherein the first peer node alters a presentation on that node of the item of content with respect to which the user feedback was accepted.

5. The system of claim 1, wherein the first peer node responds to at least selected interaction by a user of that node by adding, deleting or otherwise changing information pertaining to an item presented by that node.

6. The system of claim 1, wherein the first peer node responds to at least selected user interaction by messaging users of one or more of the other nodes.

7. The system of claim 1, wherein the first peer node responds to at least selected user interaction by forwarding an item of content to one or more other nodes.

8. The system of claim 1, wherein one or more of nodes comprise any of mobile phones, personal digital assistants, network-enabled digital picture frames, personal computers, and third-party servers.

9. The system of claim 8, wherein one or more of the third-party servers comprises any of a photo-sharing web site, a digital media company, and/or other repository of content.

10. The system of claim 9, wherein the third-party server provides one or more items of content to the shared content server any of (i) at an initiative of that third-party server, (ii) at a request of the shared content server, and (iii) at a request of a user a node.

11. The system of claim 8, wherein one or more of the third-party servers receive content from the shared content server.

12. The system of claim 11, wherein one or more of the servers that receives content from the shared content server comprises a printing service.

13. The system of claim 1, wherein said shared content server comprises one or more servers that are coupled for communication with one another over one or more networks.

14. The system of claim 13, wherein one or more of the servers that make up the shared content server comprise a central store with records and/or other structures for storing the items of content and related information.

15. The system of claim 14, wherein the related information comprises one or more of a thumbnail of an item of content, one or more versions of an item of content, supplementary information regarding acquisition of an item of content and/or its transfer to the one or more servers.

16. The system of claim 1, wherein the one or more networks include (i) a cellular network, and (ii) zero, or more Internets, metropolitan area networks (MANs), wide area networks (WANs), local area networks, personal area networks (PANs).

17. A multimedia content sharing system, comprising
   A. a shared content server storing a plurality of items of content, where the stored items of content are any of still images, moving images and audio,
   B. a plurality of nodes, each in communication coupling with the shared content server via one or more networks,
   C. the shared content server transmitting, via the one or more networks, one or more of the plurality of items of content stored on the server to each node in a first set of said nodes without a request by any user of that node for such item, wherein each node in the first set of said nodes stores the one or more of the plurality of items in a local store associated therewith
   D. at least one said node ("first peer node") in the first set of nodes, (i) presenting any of visually and/or aurally the content of at least one item of content received from the shared content server, (ii) accepting user feedback with respect to that item of content, the user feedback reflecting user input regarding the item of content, and (iii) transmitting that user feedback to the shared content server,
   E. the shared content server transmitting the user feedback to at least one other node ("second peer node") that is in the first set of nodes without retransmission of the article of content with respect to which the user feedback was accepted, which second peer node alters a presentation on that node of that item of content as stored on the local store associated therewith based on that user feedback.

18. The system of claim 17, wherein the user feedback includes commands for one or more of (i) copying the at least one item of content to an album, (ii) rotating the at least one item of content, (iii) requesting that a further node be blocked from presenting the at least one item of content, (iv) requesting that a sender of the at least one item of content be blocked from transmitting one or more items of content.

19. The system of claim 17, wherein the first peer node alters a presentation on that node of the item of content with respect to which the user feedback was accepted.

20. The system of claim 17, wherein the first peer node receives via a cellular modem at least one of the items from the shared content server.

21. The system of claim 17, wherein the first peer node alters a presentation on that node of the item of content with respect to which the user feedback was accepted.

22. The system of claim 17, wherein the first peer node responds to at least selected interaction by a user of that node by adding, deleting or otherwise changing information pertaining to an item presented by that node.

23. The system of claim 17, wherein the first peer node responds to at least selected user interaction by messaging users of one or more of the other nodes.

24. The system of claim 17, wherein the first peer node responds to at least selected user interaction by forwarding an item of content to one or more other nodes.

25. The system of claim 17, wherein one or more of nodes comprise any of mobile phones, personal digital assistants, network-enabled digital picture frames, personal computers, and third-party servers.

26. The system of claim 25, wherein one or more of the third-party servers comprises any of a photo-sharing web site, a digital media company, and/or other repository of content.

27. The system of claim 26, wherein the third-party server provides one or more items of content to the shared content server any of (i) at an initiative of that third-party server, (ii) at a request of the shared content server, and (iii) at a request of a user a node.

28. The system of claim 25, wherein one or more of the third-party servers receive content from the shared content server.

29. The system of claim 28, wherein one or more of the servers that receives content from the shared content server comprises a printing service.

30. The system of claim 17, wherein said shared content server comprises a set of one or more servers that are coupled for communication with one another over one or more networks and comprise a central store with records and/or other structures for storing the items of content and related information.

31. The system of claim 30, wherein the related information comprises one or more of a thumbnail of an item of content, one or more versions of an item of content, supplementary information regarding acquisition of an item of content and/or its transfer to the one or more servers.

32. The system of claim 17, wherein the one or more networks include (i) a cellular network, and (ii) zero, or more Internets, metropolitan area networks (MANs), wide area networks (WANs), local area networks, personal area networks (PANs).

33. A method of multimedia content sharing, comprising
   A. transmitting from a shared content server, via a first set of one or more networks, a first set of one or more items of content stored on the server to each node in a first set of one or more nodes without a request by any user of that node those one or more items, wherein each node in the first set of one or more nodes stores the first set of one or more items in a local store associated therewith,
   B. transmitting from the shared content server, via a second set of one or more networks, a second set of one or more items of content stored on the server to each node in a second set of one or more nodes without a request by any user of that node those one or more items, where (i) the second set of items may overlap the first set of items, (ii) the second set of nodes may overlap the first set of nodes, and/or (iii) the second set of networks may overlap the first set of networks, wherein each node in the second set of one or more nodes stores the second set of one or more items in a local store associated therewith,
   C. with at least one said node ("first peer node") in at least one of the first and second set of nodes, performing the steps of (i) presenting any of visually and/or aurally the content of at least one item of content received from the shared content server, (ii) accepting user feedback with respect to that item of content, the user feedback reflecting user input regarding the item of content, and (iii) transmitting that user feedback to the shared content server, D. with the shared content server, transmitting the user feedback to at least one node ("second peer node") that is in the set of nodes to which the first peer node belongs without retransmission of the article of content with respect to which the user feedback was accepted, which second peer node alters a presentation on that node of that item of content as stored on the local store associated therewith based on that user feedback.

34. The system of claim 33, wherein the items of content are any of still images, moving images and audio.

35. The system of claim 33, wherein one or more of nodes comprise any of mobile phones, personal digital assistants, network-enabled digital picture frames, personal computers, and third-party servers.

36. The method of claim 33, comprising providing one or more items of content to the shared content server from one or more of the nodes.

37. The method of claim 36, comprising (i) acquiring an item of content with a camera coupled to one of the nodes and transmitting that item of content to the shared content server, and (ii) transmitting that item of content to one or more of the other nodes via any of steps (A) and (B).

38. The method of claim 36, comprising (i) acquiring an item of multimedia content from any of a web site, networked computer, hard drive, memory stick, DVD, CD or other device or system, and (ii) transmitting that item of content to one or more of the nodes via any of steps (A) and (B).

39. The method of claim 36, comprising utilizing the shared content server to combine a said item of content received from a said node with supplementary information provided with that item of content and/or in connection with the transmission thereof from that node.

40. The method of claim 39, wherein the supplementary information comprises any of (i) header information provided with transmission of the item of content, and (ii) metadata provided with the item of content.

41. The method of claim 39, wherein any of steps (A) and (B) include transmitting a said item of content, along with at least some of the respective supplementary information, to a said node.

42. The method of claim 39, comprising, with the shared content server, processing any of (i) an item of content received from a said node, (ii) supplementary information for that item of content.

43. The method of claim 42, wherein the processing step includes generating any of (i) a thumbnail representing a said item of content received from a said node, and (b) one or more versions of such item of content optimized for presentation on one or more said nodes.

44. The method of claim 43, wherein the processing step includes generating one or more of the optimized versions by any of adjusting resolution, adjusting color, adjusting contrast, cropping, and red-eye reduction.

45. The method of claim 42, wherein the processing step includes tagging an item of content received from a said node to facilitate categorization of such item into one or more sets defined by one or more users of the one or more nodes.

46. The method of claim 45, wherein the tagging step includes tagging an item of content in accord with any of (a) a user designation, (b) supplementary information for that item of content, and (c) content of that item.

47. The method of claim 33, wherein any of steps (A) and (B) include transmitting a said item of content to a said node based on any of polling, scheduled transmission times, when one or more sensors in the node sense selected conditions thereof.

48. The method of claim 33, wherein any of steps (A) and (B) include transmitting to a said node a said item of content optimized for presentation on that node.

49. The method of claim 33, wherein step (C)(iii) includes presenting items of content received from the shared content server any of individually and/or in groups.

50. A method of multimedia content sharing, comprising
A. transmitting from a shared content server, via a first set of one or more networks, a first set of one or more items of content stored on the server to each node in a first set of one or more nodes without a request by any user of that node those one or more items, wherein each node in the first set of one or more nodes stores the first set of one or more items in a local store associated therewith,
B. with at least one said node ("first peer node") in the first set of nodes, performing the steps of (i) presenting any of visually and/or aurally the content of at least one item of content received from the shared content server, (ii) accepting user feedback with respect to that item of content, the user feedback reflecting user input regarding the item of content, and (iii) transmitting that user feedback to the shared content server,
C. with the shared content server, transmitting the user feedback to at least one node ("second peer node") that is in the first set of nodes without retransmission of the article of content with respect to which the user feedback was accepted, which second peer node alters a presentation on that node of that item of content as stored on the local store associated therewith based on that user feedback.

51. The method of claim 50, wherein step (A) includes transmitting the first set of items to the first peer node automatically upon activation of that node and its coupling to the one or more networks.

52. The method of claim 50, wherein step (A) includes transmitting the first set of items to the first peer node on one or more bases, including, any of (i) polling, (ii) scheduled transmission times, (iii) sensed activity of a user of the first peer node.

53. The method of claim 50, wherein step (A) includes transmitting the first set of items to the first peer node optimized based on the characteristics of that node.

54. The method of claim 50, wherein step (B)(i) includes presenting one or more items in the first set of images any of individually and/or in groups.

55. The method of claim 54, wherein step (B)(i) includes basing presentation of one or more items in the first set of items based on characteristics including any of tags, item sender, item subject, and/or time/date of image acquisition.

56. The method of claim 50, comprising the step of
D. acquiring one or more items of content via one or more of the nodes and transmitting that item to the shared content server for transmission to one or more of the other nodes.

57. The method of claim 56, wherein step (D) includes acquiring one or more items of content via the first peer node and transmitting that item of content to the shared content server for transmission to one or more nodes in the first set of nodes.

58. The method of claim 57, wherein step (D) includes acquiring an item of content using a camera that is any of built-in or attached to the first peer node.

59. The method of claim 57, wherein step (D) includes acquiring an item of content via download from one or more other devices and/or systems.

60. A method of multimedia content sharing, comprising
- A. grouping one or more items of content stored on a shared content server into one or more groups,
- B. transmitting to one or more nodes from the shared content server, via a first set of one or more networks, one or more items of content from a first such group of items stored on the server to each of one or more nodes in a first set of nodes having permissions in that group without a request by any user of that node for those one or more items, wherein each node in the first set of nodes stores the one or more items in a local store associated therewith,
- C. with at least said node ("first peer node") in the first set of nodes, performing the steps of (i) presenting any of visually and/or aurally the content of at least one item of content from the first group of items received from the shared content server, (ii) accepting user feedback with respect to that item of content, the user feedback reflecting user input regarding the item of content, and (iii) transmitting that user feedback to the shared content server,
- D. with the shared content server, transmitting the user feedback to at least one node ("second peer node") that is in the first set of nodes without retransmission of the article of content with respect to which the user feedback was accepted, which second peer node alters a presentation on that node of that item of content as stored on the local store associated therewith based on that user feedback.

61. The method of claim 60, wherein step (A) includes grouping a plurality of items of content on the shared content server into a plurality of groups.

62. The method of claim 60, wherein step (A) includes grouping the one or more items of content into groups based on the user feedback received accepted in step (C).

63. The method of claim 60, wherein step (A) includes grouping the one or more items of content into groups based on based on user-defined rules.

64. The method of claim 63, wherein the rules are a function of tags and/or other information associated with the respective items of content.

65. The method of claim 60, wherein step (A) includes selectively transmitting the one or more items of content from the first group of items to one or more nodes in the first set of nodes.

66. The method of claim 65, wherein step (A) includes selectively transmitting the one or more items of content from the first group of items to one or more nodes in the first set of nodes based on preferences defined for the respective nodes.

67. The method of claim 66, wherein those preferences include blocking transmission of items of content from any of designated senders, nodes and/or selected groups.

68. The method of claim 60, comprising setting permissions for nodes in a group as a function of any of payment of a service fee, activation of a user account, action of a node user, and action of an administrator.

69. The method of claim 60, wherein the items of content are any of still images, moving images and audio.

70. The method of claim 60, wherein one or more of nodes comprise any of mobile phones, personal digital assistants, network-enabled digital picture frames, personal computers, and third-party servers.

71. The method of claim 60, wherein step (C)(ii) includes accepting as user feedback a command to identifying at least one item of content as belonging to one or more of the groups.

72. The method of claim 60, including the step of blocking from transmission to one or more nodes in the first set items of content from which those nodes have been excluded.

73. The method of claim 62, wherein the blocking step includes blocking from transmission to one or more nodes in the first set of node one or more items of content from which those nodes have been excluded by a user that provide such items of content.

74. The method of claim 60, comprising the step of
- E. providing one or more items of content to the shared content server from one or more of the nodes.

75. The method of claim 74, wherein step (E) includes
- (i) acquiring an item of multimedia content from any of a camera, web site, networked computer, hard drive memory stick, DVD, CD or other device or system coupled to one of the nodes and transmitting that item of content to the shared content server, and
- (ii) transmitting that item of content to one or more of the nodes via step (B).

76. The method of claim 74, comprising utilizing the shared content server to combine a said item of content received from a said node with supplementary information provided with that item of content and/or in connection with the transmission thereof from that node.

77. The method of claim 76, comprising determining a grouping an item of content received from a said node in accord with any of (a) a user designation, (b) supplementary information for that item of content, and (c) content of that item.

78. The method of claim 77, wherein the supplementary information comprises any of (i) header information provided with transmission of the item of content, and (ii) metadata provided with the item of content.

79. The method of claim 77, wherein step (B) include transmitting a said item of content, along with at least some of the respective supplementary information, to a said node.

80. The method of claim 77, comprising, with the shared content server, processing any of (i) an item of content received from a said node, (ii) supplementary information for that item of content.

81. The method of claim 80, wherein the processing step includes generating any of (i) a thumbnail representing a said item of content received from a said node, and (b) one or more versions of such item of content optimized for presentation on one or more said nodes.

82. The method of claim 81, wherein the processing step includes generating one or more of the optimized versions by any of adjusting resolution, adjusting color, adjusting contrast, cropping, and red-eye reduction.

83. The method of claim 80, wherein the processing step includes tagging an item of content received from a said node to facilitate categorization of such item into one or more sets defined by one or more users of the one or more nodes.

84. The method of claim 60, wherein any of steps (B) and E(ii) include transmitting to a said node a said item of content optimized for presentation on that node.

* * * * *